United States Patent [19]
Nakajima et al.

[11] Patent Number: 5,544,087
[45] Date of Patent: Aug. 6, 1996

[54] NAVIGATION SYSTEM

[75] Inventors: Masahiro Nakajima; Hideo Odagaki, both of Osaka, Japan

[73] Assignee: Sumitomo Electric Industries, Ltd., Osaka, Japan

[21] Appl. No.: 249,720

[22] Filed: May 26, 1994

[30]     Foreign Application Priority Data

Jun. 4, 1993 [JP] Japan .................................... 5-134913
Jun. 29, 1993 [JP] Japan .................................... 5-159479

[51] Int. Cl.$^6$ ............................................. G06F 165/00
[52] U.S. Cl. .......................... 364/443; 364/449; 340/990; 340/995
[58] Field of Search ................................... 364/443, 444, 364/449; 73/178 R; 340/988, 990, 995; 395/185.05

[56]           References Cited

U.S. PATENT DOCUMENTS

| | | | |
|---|---|---|---|
| 4,701,914 | 10/1987 | Matsushita ......................... | 395/185.05 |
| 4,954,959 | 9/1990 | Moroto et al. .......................... | 340/995 |
| 4,992,947 | 2/1991 | Nimura et al. .......................... | 340/995 |
| 5,172,321 | 12/1992 | Ghaem et al. .......................... | 340/995 |
| 5,189,430 | 2/1993 | Yano et al. .............................. | 364/449 |
| 5,231,584 | 7/1993 | Nimura et al. .......................... | 340/995 |
| 5,365,449 | 11/1994 | Kashiwa .................................. | 340/995 |
| 5,383,128 | 1/1995 | Nishida et al. .......................... | 340/995 |
| 5,404,495 | 4/1995 | Yoneda ................................. | 395/185.05 |

FOREIGN PATENT DOCUMENTS 0330787   9/1989   European Pat. Off. .

WO9210808   6/1992   WIPO .

OTHER PUBLICATIONS

Patent Abstracts of Japan, vol. 13, No. 19, 18 Jan. 1989.
Vehicle Electronics in the 90's: Proceedings of the International Congress on Transportation Electronics, 15–17 Oct. 1990, Dearborn, MI, USA, pp. 143–154, P. Shah et al., "Programmable Memory Trends in the Automotive Industry Vehicle Navigation & Information Systems" Conference Record (VNIS '89), 11–13 Sep. 1989, Toronto, Ontario, Canada, pp. A3–A8, J. B. Alegiani et al., An In-Vehicle Navigation and Information System Utilizing Defined Software Services.

*Primary Examiner*—Gary Chin
*Attorney, Agent, or Firm*—Lane, Aitken & McCann

[57]           ABSTRACT

A navigation system for a vehicle comprises a central processing unit for executing a plurality of programs including a navigation program and a transmitting program, and an internal nonvolatile storage device electrically connected to the central processing unit through an inner bus and storing therein the transmitting program. The navigation system further comprises an external storage device electrically connected to the inner bus through an interface unit and storing therein the navigation program. The central processing unit is initially operated to execute the transmitting program to read the navigation program from the external storage device and store the read navigation program in the internal nonvolatile storage device, and subsequently operated to repeat the execution of the navigation program stored in the internal nonvolatile storage device to provide a vehicle driver with navigation information including the current location of the vehicle.

25 Claims, 20 Drawing Sheets

NAVIGATION SYSTEM

FIELD OF THE INVENTION

The present invention relates generally to a navigation system for a vehicle and particularly to a navigation system comprising a navigation apparatus which is mounted on a vehicle for providing a vehicle driver with the navigation information such as vehicle current location by executing a navigation program stored in a storage device included in the navigation apparatus.

DESCRIPTION OF THE PRIOR ART

A variety of navigation apparatus has so far been developed and used to readily guide a vehicle driver to his destination in an unfamiliar area. Such a navigation apparatus is mounted on a vehicle as comprising a display unit such as a CRT (Cathode Ray Tube) display for having current location of a vehicle displayed on its screen with a road map around the current location of the vehicle, a control unit including a mask read-only memory (hereinlater simply referred to as "mask ROM") storing therein various programs including at least one navigation program, and a central processing unit (hereinlater simply referred to as "CPU") for executing the various programs. The current location of the vehicle displayed on the screen of the display unit is obtained by executing the navigation program stored in the mask ROM of the control unit. The navigation apparatus thus constructed, however, has a drawback in that a user of the navigation apparatus, for example, the vehicle driver cannot change and modify the navigation program after the user purchases the navigation apparatus, since the navigation program is previously stored in the mask ROM of the control unit. To avoid such a drawback, there has been proposed an improved navigation system, for instance, disclosed in Japanese Laid-open Patent Publication No. 4-195184 and shown partially in FIG. 23.

The navigation apparatus shown in FIG. 23 comprises a location detecting unit 11 for detecting the current location of a vehicle, a CD-ROM (Compact Disk Read-only Memory) drive unit 12 for reading a navigation program stored in a CD-ROM (not shown), a display unit 13 for displaying on its screen the current location of the vehicle with a road map around the current location of the vehicle, a control unit 14 for controlling the location detecting unit 11, the CD-ROM drive unit 12 and the display unit 13. The control unit 14 comprises a CPU 14a for executing the navigation program, a RAM (Random Access Memory) 14b for temporally storing therein the navigation program, navigation data and so on, and an inner bus 14c 13 for electrically connecting the CPU14a and the RAM 14b to permit signals to transmitted between the CPU 14a and the RAM 14b. The control unit is designed to read the navigation program from the CD-ROM through CD-ROM drive unit 12 and store the read navigation program in the RAM 14b when the electric power is supplied to the navigation apparatus. The navigation program stored in the RAM 14b of the control unit 14 is read and executed by the CPU 14a of the control unit 14 to have the current location of the vehicle and the road map around the current location of the vehicle displayed on the screen of the display unit 13. In the prior-art improved navigation apparatus thus constructed, the user of the navigation apparatus can readily utilize, for instance, a new version of the navigation program by exchanging the CD-ROM for a new version of the CD-ROM, since the navigation program is not stored in a ROM but in the CD-ROM.

The prior-art improved navigation apparatus, however, has a drawback in that the vehicle driver is reduced to waiting for a long time after the supply of the electric power until the current location of the vehicle is displayed on the screen of the display unit 13. More specifically, the navigation program is read from the CD-ROM through the CD-ROM drive unit 12 and stored in the RAM 14b which is in the form of a volatile storage device as well known. As a consequence, the navigation program stored in the RAM 14b is erased when the electric power supplied to the navigation apparatus is shut off. This means that the navigation program is required to be read from the CD-ROM through the CD-ROM drive unit 12 and stored in the RAM 14b each time the electric power is supplied to the navigation apparatus. Additionally, the time between the starts of the supply of the electric power and the execution of the navigation program is several tens of seconds to several minutes in the navigation apparatus constructed as above mentioned. The vehicle driver, therefore, is required to wait for an intolerably long time whenever the electric power is supplied to the navigation apparatus, and irritated by the long wait.

The prior-art improved navigation apparatus has another drawback in that the exchange of the navigation programs is extremely expensive and enforces a difficult task upon the user of the navigation apparatus for the reasons described hereinafter.

The CD-ROM operated by the CD-ROM drive unit 12 has a data capacity of at least 500 megabytes as well known and stores not only the navigation program but also digital map data base comprising road map data indicative of road maps in a predetermined area Y and reference data indicative of famous hotels and architectures. In general, the navigation program is less than 1 megabyte in size and therefore merely occupy a small part of the storage area of the CD-ROM. To utilize a new version of the navigation program, the CD-ROM is required to be exchanged for a newly made CD-ROM if the digital map data base is not renewal. This means that user of the navigation apparatus must repurchase an expensive CD-ROM for the purpose of utilizing a new version of the navigation program merely occupying a small part of the storage area of the CD-ROM and as a consequence the user of the navigation apparatus necessarily obtain the new version of the navigation program at great expense.

The prior-art navigation apparatus is of built-in type or of so-called later installed type. The navigation apparatus of built-in type is previously installed in the vehicle so as to be inconspicuous and unobtrusive so that a CD-ROM drive unit 12 partially forming the navigation apparatus and operating the CD-ROM is set, for instance, in the innermost of the trunk room of the vehicle. Therefore, the user of the navigation apparatus has difficulty in exchanging the CD-ROM contained in the CD-ROM drive unit 12 for a new version of the CD-ROM. The difficult work for exchanging the CD-ROM further puts the user of the navigation apparatus to expense if the user of the navigation apparatus request the difficult work of an expert.

On the other hand, the control unit 14 of the navigation apparatus is adapted to automatically read the navigation program from the CD-ROM through the CD-ROM drive unit 12 and executing the read navigation program. For this reason, a plurality of CD-ROMs are required to be prepared by the user of the navigation apparatus if there are a plurality of navigation programs each corresponding to each of a plurality of navigation functions different from one another.

An object of the present invention is to provide a further improved navigation system which will eliminate the drawbacks thus encountered in the prior-art improved navigation apparatus of the above described nature.

SUMMARY OF THE INVENTION

According to one aspect of the present invention there is provided a navigation system for a vehicle, comprising a central processing unit mounted on the vehicle for executing a plurality of programs including a navigation program and a transmitting program, an external storage device mounted on the vehicle for storing therein the navigation program, an internal nonvolatile storage device mounted on the vehicle for storing therein the transmitting program, an inner bus mounted on a vehicle for having the central processing unit electrically connected to the internal nonvolatile storage device to permit signals to be transmitted between the central processing unit and the internal nonvolatile storage device, and an interface unit having the external storage device electrically connected to the inner bus to permit the external storage device to be brought in communication with the central processing unit and the internal nonvolatile storage device, the central processing unit being initially operated to execute the transmitting program to read the navigation program from the external storage device and store the read navigation program in the internal nonvolatile storage device, and subsequently operated to repeat the execution of the navigation program stored in the internal nonvolatile storage device to provide the vehicle driver with the navigation information including the current location of the vehicle.

According to another aspect of the present invention there is provided a navigation system for a vehicle, comprising a central processing unit mounted on the vehicle for executing a plurality of programs including a navigation program and a transmitting program, an external storage device mounted on the vehicle for storing therein the navigation program, an internal nonvolatile storage device mounted on the vehicle for storing therein the transmitting program, an inner bus mounted on the vehicle for having the central processing unit electrically connected to the internal nonvolatile storage device to permit signals to be transmitted between the central processing unit and the internal nonvolatile storage device, and an interface unit having the external storage device electrically connected to the inner bus to permit the external storage device to be brought in communication with the central processing unit and the internal nonvolatile storage device, the internal nonvolatile storage device including a read-only memory storing therein the transmitting program and an erasable programmable read-only memory, whereby the central processing unit being initially operated to execute the transmitting program to read the navigation program from the nonvolatile storage device and store the read navigation program in the erasable programmable read-only memory, and subsequently operated to repeat the execution of the navigation program stored in the erasable programmable read-only memory to provide the vehicle driver with the navigation information including the current location of the vehicle.

According to a further aspect of the present invention there is provided a navigation system for a vehicle, comprising a central processing unit mounted on the vehicle for executing a plurality of programs including a navigation program and a transmitting program, an external storage device exterior to the vehicle and storing therein the navigation program, an internal nonvolatile storage device mounted on the vehicle and storing the transmitting program, an inner bus mounted on the vehicle and having the central processing unit electrically connected to the external storage device and the internal nonvolatile storage device to permit signals to be transmitted between the central processing unit and the external storage device, and a communication device partly mounted on and partly exterior to the vehicle, and having the external storage device electrically connected to the inner bus to permit the external storage device to be brought in communication with the central processing unit and the internal nonvolatile storage device, the central processing unit being initially operated to execute the transmitting program to read the navigation program from the external storage device through the communication device and store the read navigation program in the internal storage device, and subsequently operated to repeat the execution of the navigation program stored in the internal storage device to provide the vehicle driver with the navigation information including the current location of the vehicle.

According to a yet further aspect of the present invention there is provided a navigation system for a vehicle, comprising a central processing unit mounted on the vehicle for executing a plurality of programs including a navigation program and a transmitting program, an external storage apparatus exterior to the vehicle and storing therein the navigation program, an internal nonvolatile storage device mounted on the vehicle and storing the transmitting program, an inner bus mounted on the vehicle and having the central processing unit electrically connected to the external storage apparatus and the internal nonvolatile storage device to permit signals to be transmitted between the central processing unit and the external storage apparatus, and a communication apparatus partly mounted on and partly exterior to the vehicle, and having the external storage apparatus electrically connected to the inner bus to permit the external storage apparatus to be brought in communication with the central processing unit and the internal nonvolatile storage device, the internal nonvolatile storage device including a read-only memory storing therein the transmitting program and an erasable programmable read-only memory, whereby the central processing unit being initially operated to execute the transmitting program to read the navigation program from the external storage apparatus through the communication apparatus and store the read navigation program in the erasable programmable read-only memory, and subsequently operated to repeat the execution of the navigation program stored in the erasable programmable read-only memory to provide the vehicle driver with the navigation information including the current location of the vehicle.

BRIEF DESCRIPTION OF THE DRAWINGS

The features and advantages of a navigation system for a vehicle in accordance with the present invention will be more clearly understood from the following description taken in conjunction with the accompanying drawings in which.

DESCRIPTION OF THE PREFERRED EMBODIMENTS

Figure 1:
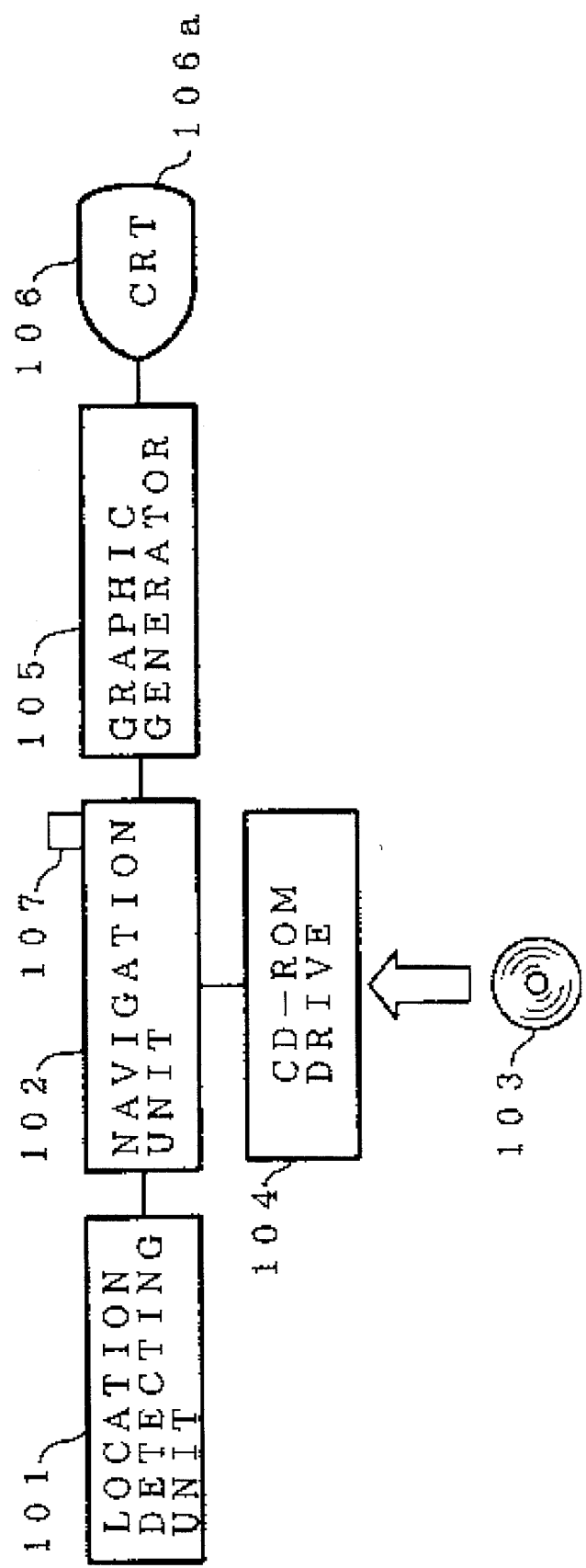
FIG. 1 shows a block diagram of a first embodiment of a navigation apparatus according to the present invention.

Referring to FIGS. 1 to 9 of the drawings, first particularly to FIG. 1 thereof, a first embodiment of a navigation system to which the present invention appertains is shown comprising a location detecting unit 101 for detecting the current location of a vehicle, a navigation unit 102 for executing various programs including at least a navigation program to provide a vehicle driver with navigation information comprising the current location of the vehicle, an external storage device 103 such as a CD-ROM for storing the various programs, and a CD-ROM drive unit 104 for reading from the external storage device 103 to feed the navigation unit 101.

The location detecting unit 101 is designed to calculate an estimated vehicle location through a so-called dead-reckoning which comprises the steps of deriving output signals from a distance sensor and a heading sensor (each not shown) at regular intervals, integrating the variations of the derived output signals to produce travel data, and calculating the estimated vehicle location based on the produced travel data. The current location of the vehicle is calculated by the location detection unit 101 on the basis of the calculated estimated vehicle location through a so-called map matching method, for example, taught by Japanese Patent Laid-open Publications No. 63-148115 and No. 64-53112.

While there has been described in the above and shown in the drawings as to the fact that the current location of the vehicle is detected on the basis of outputs of a self-contained sensor system comprising the distance sensor and the heading sensor, the current location of the vehicle may be calculated depending upon a radio wave receiving system such as a GPS (Global Positioning System) in addition to or instead of the self-contained sensor system. In the GPS, positions of the GPS satellites revolving around the earth are calculated on the basis of data sent from the GPS satellites and data concerning orbits of the GPS satellites. At the same time, propagation times necessary for the radio wave to travel from the GPS satellites, respectively, to the vehicle are measured, and subsequently the current location of the vehicle is detected on the basis of the positions of the GPS satellites and the propagation times. In addition, the current location of the vehicle can be detected depending upon radio waves sent from beacon transmitters placed at roadside.

The location detecting unit 101 is electrically connected to a road map memory (not shown) storing therein road map data indicative of road map of a predetermined area. Data based on the current location of the vehicle together with the road map data indicative of to the road map around the current location of the vehicle is fed from the location detecting unit 101 to the navigation unit 102 if the current location of the vehicle is detected by the location detecting unit 101.

Figure 2:
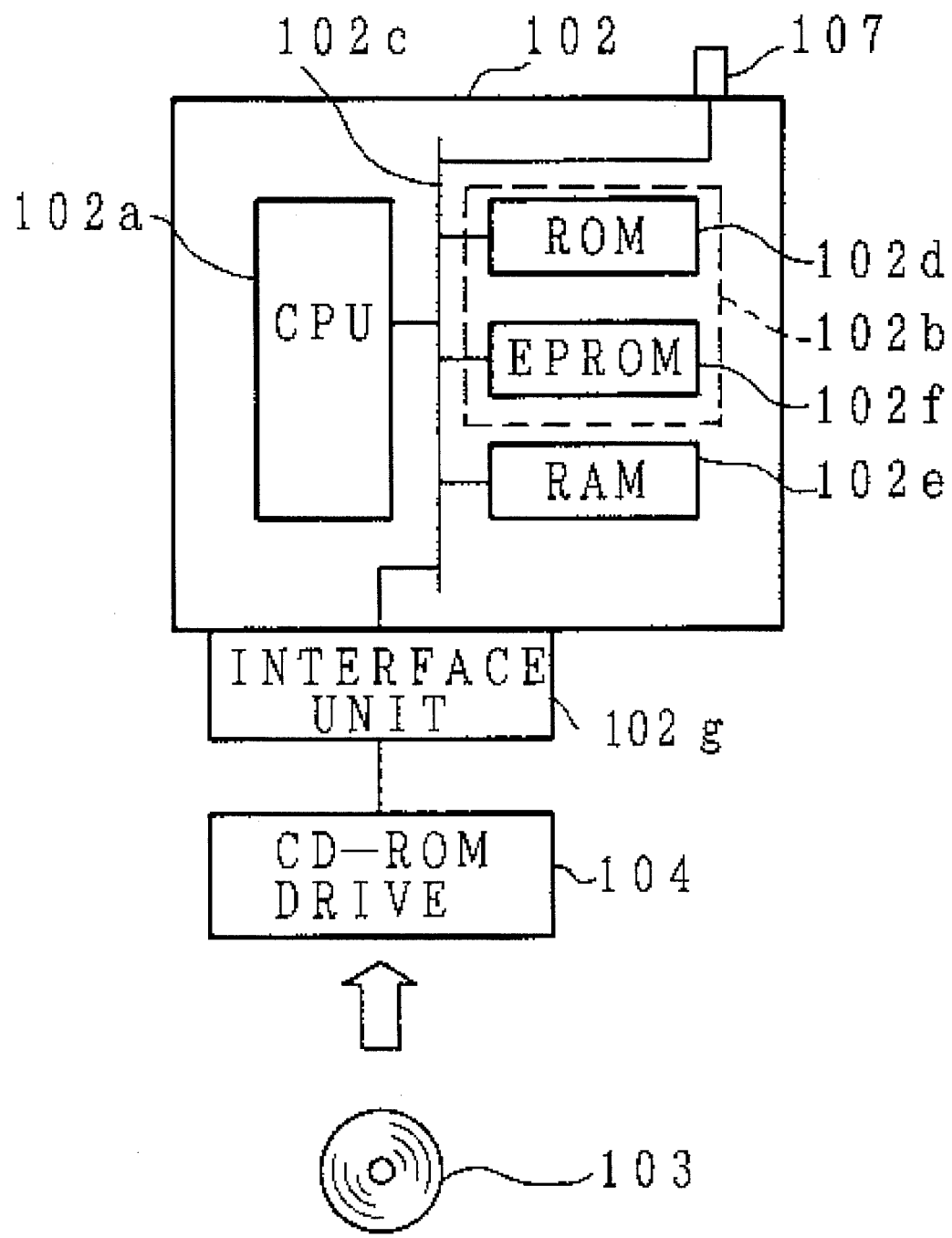
FIG. 2 shows a block diagram of a navigation unit and a CD-ROM drive unit shown in FIG. 1.

The navigation unit 102 shown in FIG. 2 as comprising a CPU 102a for executing the various programs including not only the navigation program but also a transmitting program and an error check program or an error check correction program, an internal nonvolatile storage device 102b storing therein the transmitting program and the error check program or the error check correction program, and a RAM 102e for temporarily storing the programs, calculation data and so forth. The navigation unit 102 further comprises an inner bus 102c including an address bus, a control bus and data bus and having the CPU 102a, the internal nonvolatile storage device 102b and the RAM 102e electrically connected to one another to permit signals to be transmitted between the CPU 102a and the internal nonvolatile storage device 102b, between the CPU 102a and the RAM 102e and between the internal nonvolatile storage device 102b and the RAM 102e.

The navigation system further comprises an interface unit 102g having the CD-ROM drive unit 104 connected to the inner bus 102d of the navigation unit 102 to permit the external storage device 103 to be brought in communication with the CPU 102a, the internal nonvolatile storage device 102b and the RAM 102e of the navigation unit 102.

The internal nonvolatile storage device 102b comprises a ROM 102d such as a mask ROM or a programmable ROM for storing therein the transmitting program, and an erasable programmable read-only memory 102f (hereinlater simply referred to as "EPROM") such as an electrically erasable programmable read-only memory (EEPROM) or a flash memory (FROM). The CPU 102a of the navigation unit 102 is initially operated to execute the transmitting program stored in the ROM 102d to read the navigation program from the external storage device 103 through the CD-ROM drive unit 104 and store the read navigation program in the EPROM 102f, and subsequently operated to repeat the execution of the navigation program stored in the EPROM 102f of the navigation unit 102 to provide the vehicle driver with the navigation information including the current location of the vehicle and the road map around the current vehicle position. More specifically, the transmitting program comprises a first transmitting program for reading the navigation program from the external storage device 103 to store the read navigation program to the RAM 102e of the navigation unit 102, and a second transmitting program for reading the navigation program from the RAM 102e of the navigation unit 102 to store the read navigation program in the EPROM 102f of the navigation unit 102. If the navigation apparatus is used for the first time, the first transmitting program stored in the ROM 102d of the navigation unit 102 is executed by the CPU 102a to read the navigation program from the external storage device 103 and store the read navigation program in the RAM 102e of the navigation unit 102. At this time, the navigation program is stored in the RAM 102c of the navigation unit 102 so as to include error detecting codes, thereby making it possible to detect the error of the navigation program as described hereinlater in detail. The second transmitting program stored in the ROM 102d of the navigation unit 102 is executed by the CPU 102a at the predetermined time after the execution of the first transmitting program to read the navigation program stored in the RAM 102e of the navigation unit 102 and store the read navigation program in the EPROM 102f of the navigation unit 102. The navigation program stored in the RAM 102e of the navigation unit 102 is erased after the navigation program is stored in the EPROM 102f, whereas the navigation program stored in the EPROM 102f of the navigation unit 102 is not erased if the electric power supplied to the navigation apparatus is shut off. Although the internal storage device 102b of the navigation unit 102 comprises the ROM 102d storing the transmitting program therein and the EPROM 102f in the explanation described hereinbefore, the internal storage device 102b of the navigation unit 102 may comprise an EPROM serving as both the ROM 102d and the EPROM 102f.

The ROM 102d of the navigation unit 102 further stores an error check program to be executed by the CPU 102a of the navigation unit 102 to detect the error of the navigation program stored in the EPROM 102f of the navigation unit 102 on the basis of the error detecting codes of the navigation program. The CPU 102a of the navigation unit 102 is adapted to execute the transmitting program to read the navigation program from the external storage device 103 and store the read navigation program in the EPROM 102f of the navigation unit 102 when the error of the navigation program stored in the EPROM 102f of the navigation unit 102 is detected by executing the error check program. The navigation program stored in the external storage device 103 is transmitted to the EPROM 102f of the navigation unit 102 by executing the transmitting program after the error detection, and accordingly substituted for the erroneous navigation program stored in the EPROM 102f. The error detecting codes are defined, for example, by cyclic redundancy characters or checksums.

Although the navigation program is stored in the RAM 102e of the navigation unit 102 so as to include error detecting codes by the execution of the first transmitting program in the aforesaid description, the navigation program can be stored in the RAM 102e of the navigation unit 102 so as to include error detecting and correcting codes instead of the error detecting codes. In this case, the ROM 102d of the navigation unit 102 stores an error check correction program instead of the error check program to be executed by the CPU 102a of the navigation unit 102. When the error check correction program is executed by the CPU 102a of the navigation unit 102, the error of the navigation program is detected on the basis of the error detecting and correcting codes of the navigation program and subsequently a determination is made of whether the detected error of the navigation program is correctable or not. When the detected error of the navigation program stored in the EPROM 102f of the navigation unit 102 is correctable, the detected error of the navigation program is corrected. When the detected error of the navigation program stored in the EPROM 102f of the navigation unit 102 is uncorrectable, the CPU 102a of the navigation unit 102 executes the first and second transmitting programs to read the navigation program from the external storage device 103 and store the read navigation program in the EPROM 102f of the navigation unit 102, thereby correcting the navigation program stored in the EPROM 102f of the navigation unit 102. The above mentioned error detecting and correcting codes are defined, for instance by Hamming codes.

Turning back to FIG. 1, the navigation system further comprising a graphic generator 105 for generating graphic data based on the output signal of the navigation unit 102, and a display unit 106 such as a CRT for displaying, on its screen 106a, various information in accordance with the generated graphic data. The various information comprises information as to the current location of the vehicle and the road map around the current position of the vehicle, information that the error of the navigation program stored in the EPROM 102f of the navigation unit 102 is detected, and information as to a program management and a program selection described hereinlater. The information that the error of the navigation program stored in the EPROM 102f of the navigation unit 102 is detected may be voiced by a loudspeaker unit (not shown) in addition to or in place of the display unit 106.

Figure 5:
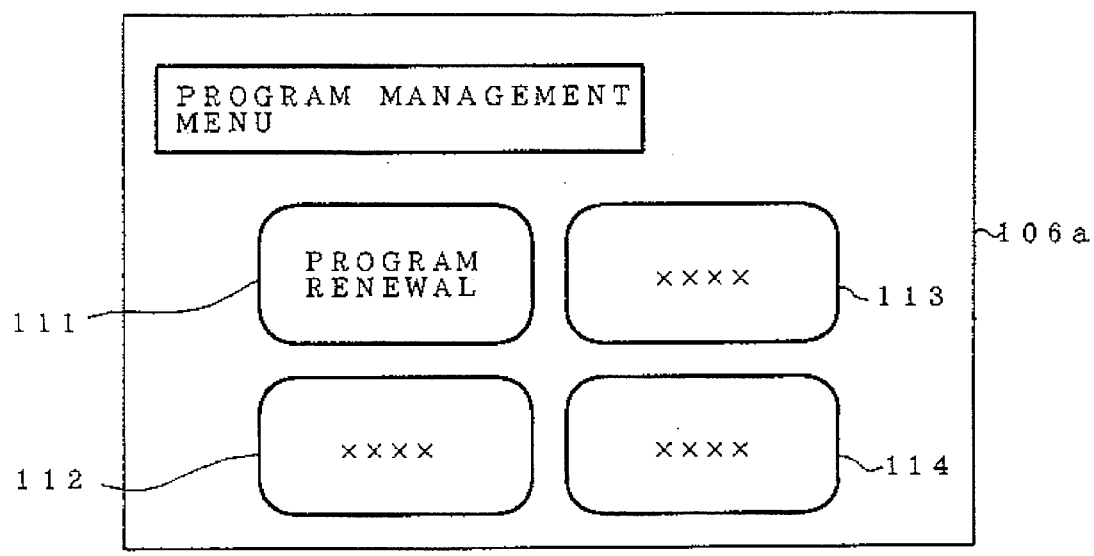
FIG. 5 shows a program management menu displayed on a screen of a display unit shown in FIG. 1.
Figure 6:
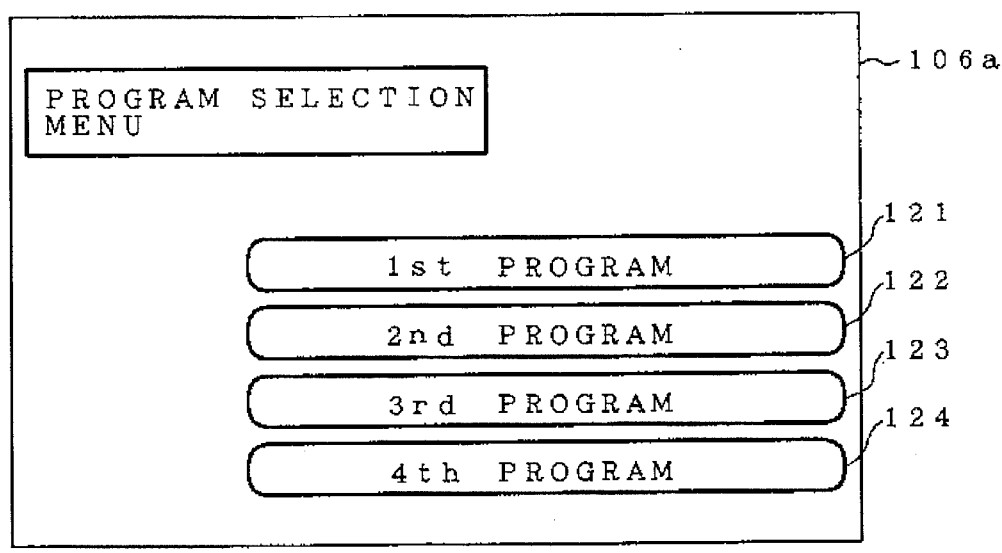
FIG. 6 shows a program selection menu displayed on the screen of the display unit shown in FIG. 1.

The ROM 102d of the navigation unit 102 further stores therein a selection program when a plurality of navigation programs is stored in the external storage device 103. If the selection program stored in the ROM 102d of the navigation unit 102 is executed by the CPU 102a before the execution of the transmitting program stored in the ROM 102d of the navigation unit 102, a program management menu shown in FIG. 5 is displayed on the screen 106a of the display unit 106. A program selection menu shown in FIG. 6 is displayed on the screen 106a of the display unit 106, if a touch key 111 on the screen of the display unit 106 is touched by the vehicle driver. The vehicle driver can select a desirable program from the navigation programs by touching one of touch keys 121 to 124 corresponding to first to fourth navigation programs, respectively.

In the meantime, the EPROM 102f of the navigation unit 102 is operative to assume two different operation modes consisting of a normal mode serving as an erasable programmable read-only memory and a read-only mode serving as an read-only memory. The navigation apparatus further comprises a mode selection switch which is operated by the vehicle driver to switch the EPROM 102f between the norms/mode and the read-only mode. Instead of the mode selection switch 107 is used a mode switch program which is stored in the ROM 102d of the navigation unit 102 and executed by the CPU 102a of the navigation unit 102 after the execution of the transmitting program, so that the EPROM 102f of the navigation unit 102 can be automatically switched from the norms/mode to the read-only mode.

Figure 3:
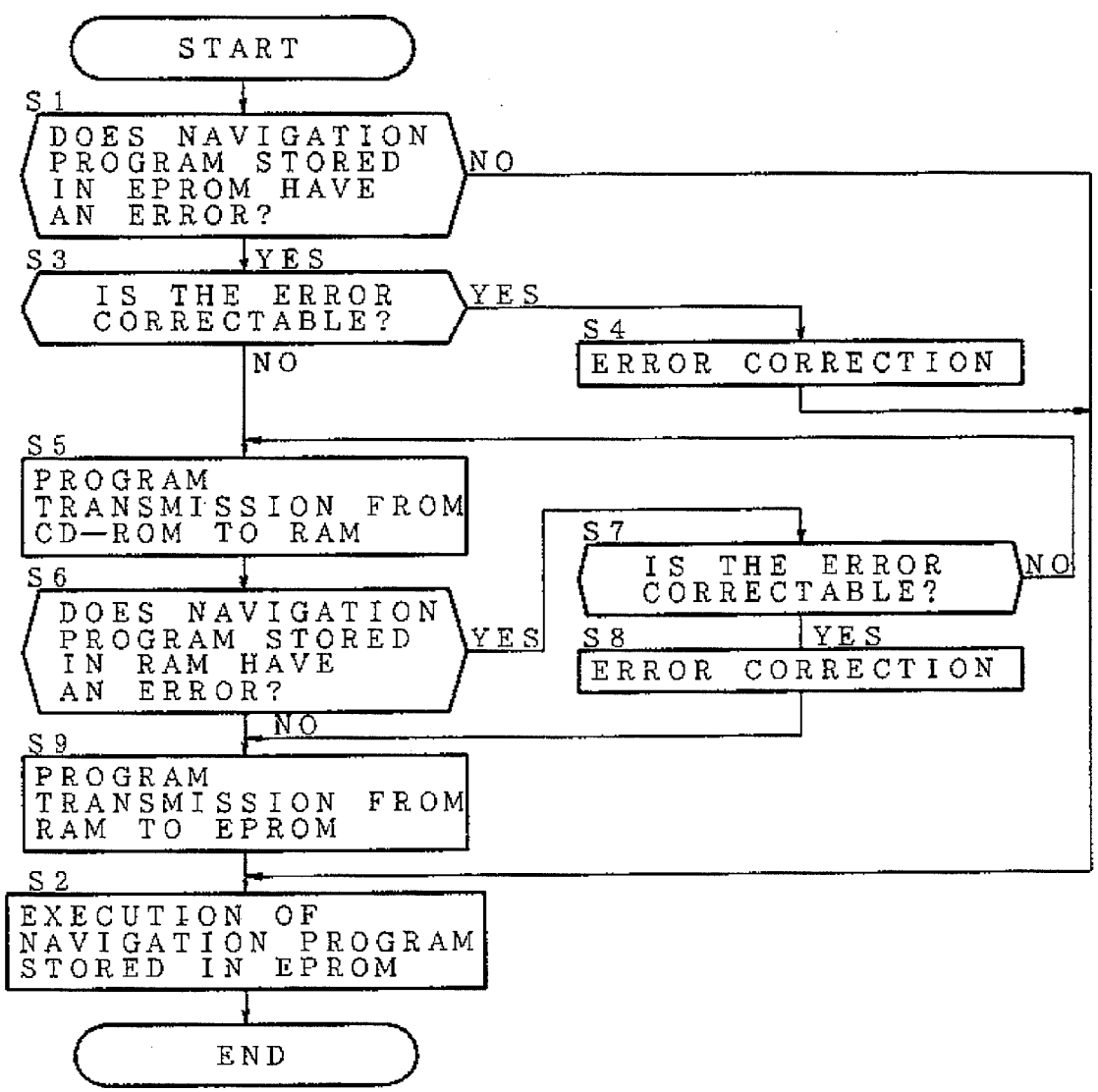
FIG. 3 shows a flowchart representing a first example of the operation of the navigation system shown in FIG. 1.

The operation of the program error correction after the execution of the transmitting program will be described hereinafter with reference to a flowchart shown in FIG. 3 on the assumption that the navigation program stored in the EPROM 102f of the navigation unit 102 has error detecting and correcting codes.

As will be understood from the description as set forth above, the navigation program which is to be executed by the CPU 102a of the navigation unit 102 is already stored in the EPROM 102f of the navigation unit 102 by the execution of the transmitting program. Firstly, a determination is made of whether or not the navigation program stored in the EPROM 102f of the navigation unit 102 has an error in a step S1 because of the fact that it is possible that navigation program has an error caused, for instance, by the program transmission. If the answer in the step S1 is in the negative "NO", i.e., if the navigation program has not an error, the step S1 proceeds to a step S2 in which the navigation program stored in the EPROM 102f of the navigation unit 102 is executed by the CPU 102a of the navigation unit 102 to provide the vehicle driver with the navigation information through the display unit 106. If the answer in the step S1 is in the affirmative "YES", the step S1 proceeds to a Step S3 in which a determination is made of whether or not the error of the navigation program store in the EPROM 102f of the navigation unit 102 is correctable. If the answer in the step S3 is in affirmative "YES", the step S3 proceeds to a step S4 in which the error of the navigation program stored in the EPROM 102f of the navigation unit 102 is corrected, and subsequently the step S4 proceeds to the step S2 to execute the navigation program stored in the EPROM 102f of the navigation unit 102. The aforementioned steps S1, S3 and S4 is carried out by executing the error check correction program stored in the ROM 102d of the navigation unit 102.

If the answer in the step S3 is in the negative "NO", i.e., if the error of the navigation program stored in the EPROM 102f of the navigation unit 102 is uncorrectable, the step S3 proceeds to a step S5 in which the first transmitting program is executed by the CPU 102a of the navigation unit 102 to read the navigation program from the external storage device 103 through the CD-ROM-drive unit 104 and store the read the navigation program in the RAM 102e of the navigation unit 102. In a step S6, the determination is made of whether or not the navigation program stored in the RAM 102e of the navigation unit 102 has an error. If the answer in the step S6 is in the affirmative "YES", the step S6 proceeds to a step S7 in which a determination is made of whether or not the error of the navigation program stored in the RAM 102e of the navigation unit 102 is correctable. If the answer in the step S7 is in the affirmative "YES", the step S7 proceeds to a step S8 in which the error of the navigation program stored in the RAM 102e of the navigation unit 102 is corrected, and subsequently the step S8 proceeds to a step S9. If, on the other hand, the answer in the step S7 is in the negative "NO", the step S7 returns to the step S5 to execute the first transmitting program stored in the ROM 102d of the navigation unit 102. In the step S9, the second transmitting program is executed by the CPU 102a of the navigation unit 102 to transmit the navigation program from the RAM 102e to the EPROM 102f. As a result, the unerring navigation program can be executed by the CPU 102a of the navigation unit 102 in the step S2.

Figure 4:
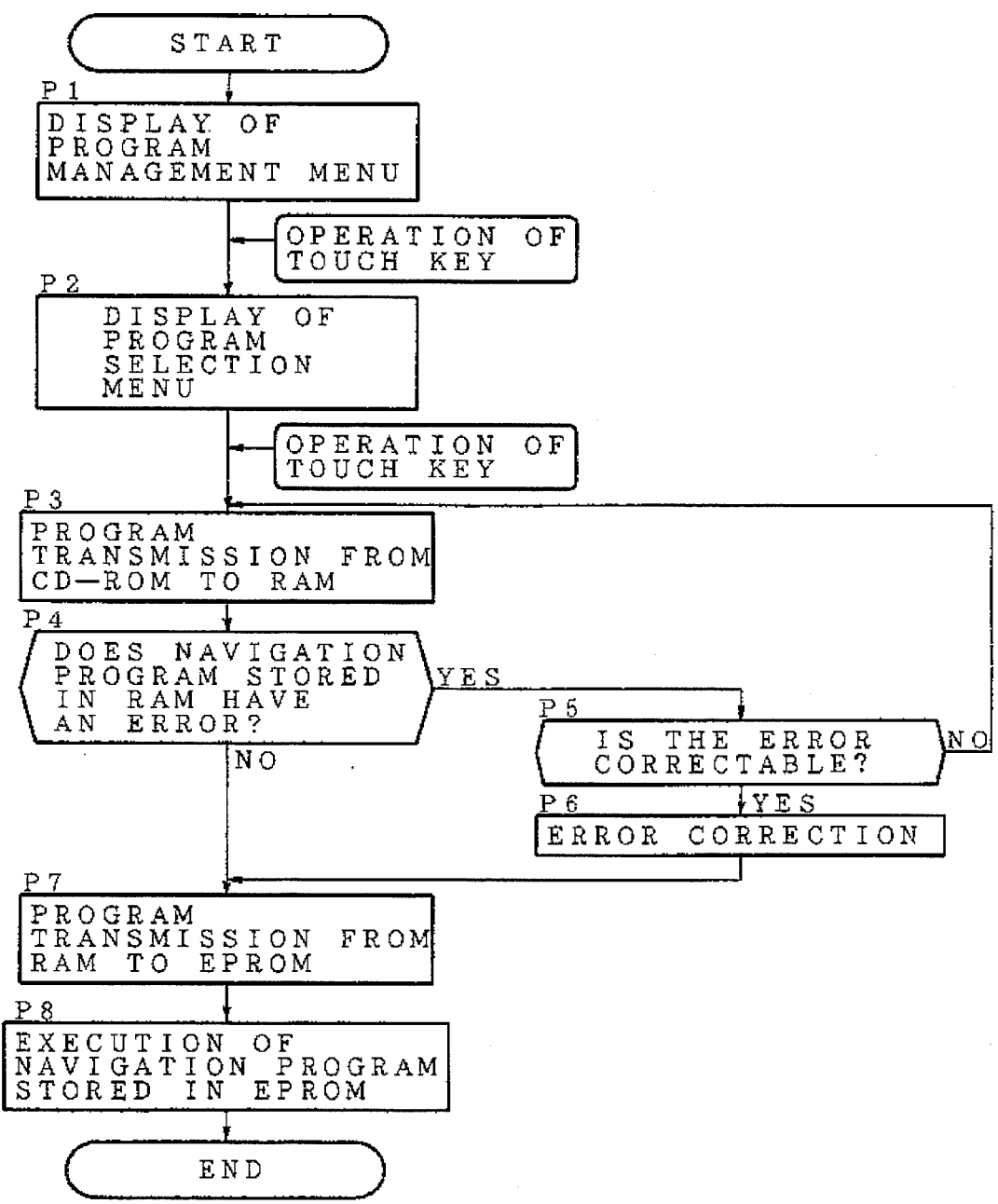
FIG. 4 shows a flowchart representing a second example of the operation of the navigation system shown in FIG. 1.

The operation of the program selection will be described hereinafter with reference to a flowchart shown in FIG. 4 and the program management menu and the program selection menu shown in FIGS. 5 and 6 on the assumption that a plurality of navigation programs are stored in the external storage device 103 and that the navigation apparatus is used for the first time, or the navigation program stored in the EPROM 102f of the navigation unit 102 is required to be exchanged for other navigation programs.

In a step P1, on the screen of the display unit 106 is displayed the program management menu which is shown in FIG. 5 as defining a plurality of function touch keys 111 to 114 on the screen of the display unit 106. If the function touch key 111 on the screen of the display unit 106 is touched by the vehicle driver, the step P1 proceeds to a step P2 in which the program selection menu shown is displayed on the screen of the display unit 106. The program selection menu is shown in FIG. 6 as defining, on the screen of the display unit 106, a plurality of program selection touch keys 121 to 124 corresponding to the first to fourth navigation programs, respectively.

If one of the program selection touch keys 121 to 118, for example, the program selection touch key 121 corresponding to the first navigation program is touched by the vehicle driver, the step P2 proceeds to a step P3 in which the first transmitting program is executed by the CPU 102a of the navigation unit 102 to read the first navigation program from the external storage device 103 and store the read the first navigation program in the RAM 102e of the navigation unit 102. Next, in a step P4, a determination is made of whether the first navigation program stored in the RAM 102e of the navigation unit 102 has an error or not. If the answer in the step P4 is in the affirmative "YES", the step P4 proceeds to a step P5 in which a determination is made of whether the error of the first navigation program stored in the RAM 102e of the navigation unit 102 is correctable or not. If the answer in the step P5 is in the affirmative "YES", the step P5 proceeds to a step P6 in which the error of the first navigation program stored in the RAM 102e of the navigation unit 102 is corrected, and subsequently the step P6 proceeds to a step P7. If, on the other hand, the answer in the step P5 is in the "NO", i.e., if the error of the first navigation program stored in the RAM 102e of the navigation unit 102 is uncorrectable, the step P5 returns to the step P3 to execute the first transmitting program stored in the ROM 102d of the navigation unit 102. In the step P7, the second transmitting program is executed by the CPU 102a of the navigation unit 102 to transmit the first navigation program from the RAM 102e to the EPROM 102f. As a result, the unerring navigation program can be executed by the CPU 102a of the navigation unit 102 in a step P8 subsequent to the step P7.

Figure 7:
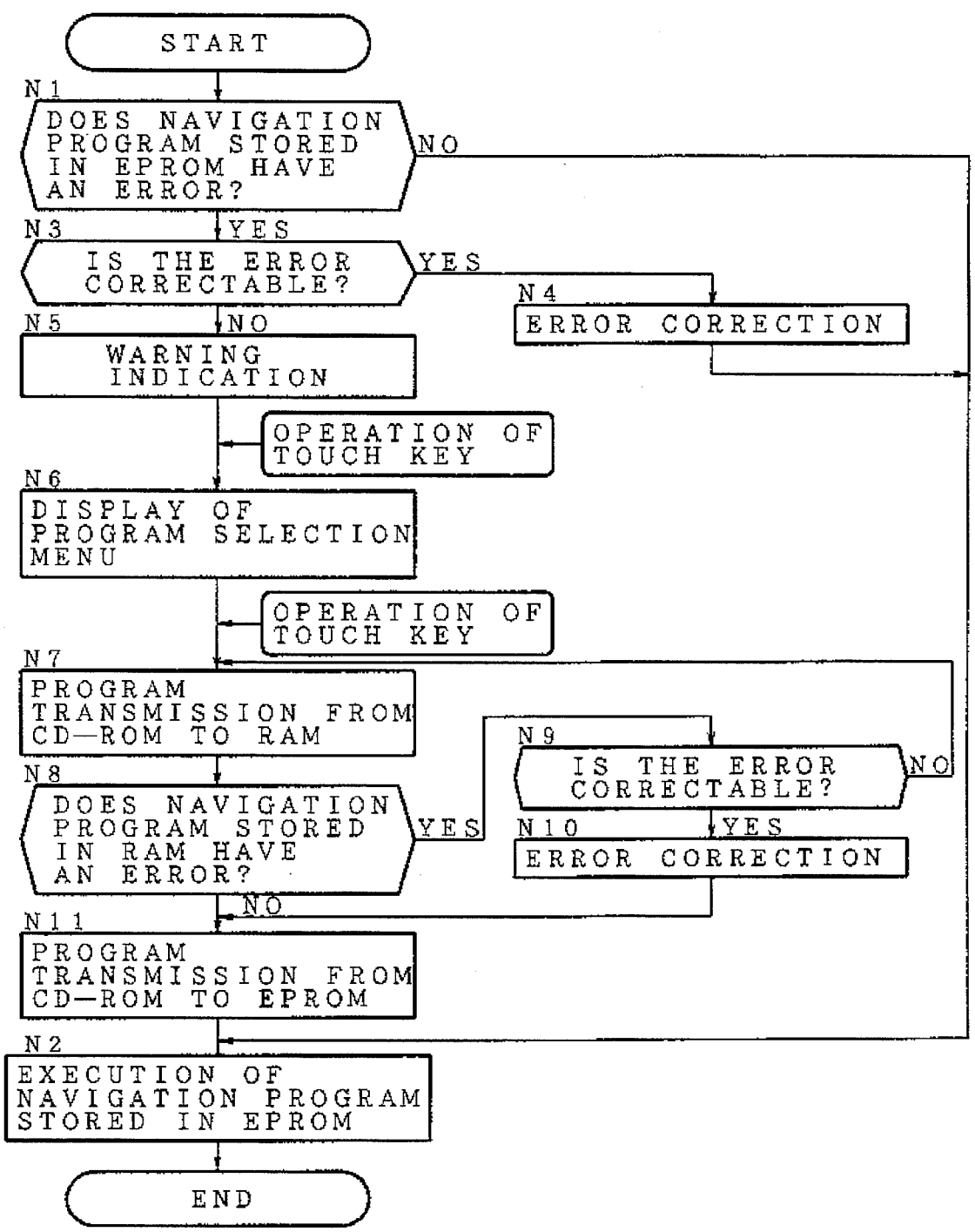
FIG. 7 shows a flowchart representing a third example of the operation of the navigation system shown in FIG. 1.
Figure 8:
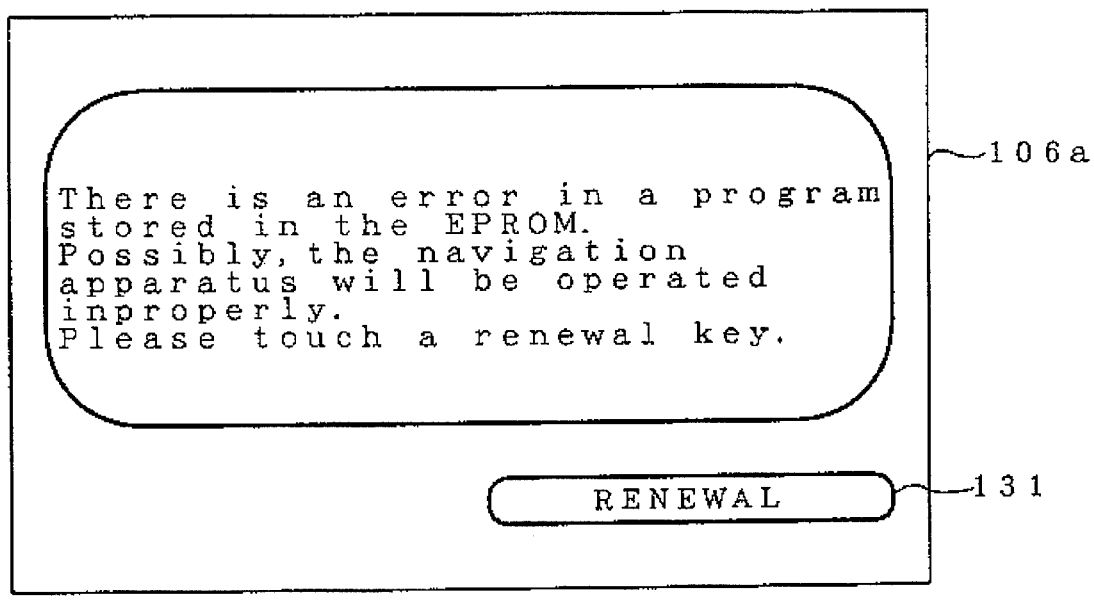
FIG. 8 shows a warning indication displayed on the screen of the display unit shown in FIG. 1.
Figure 9:
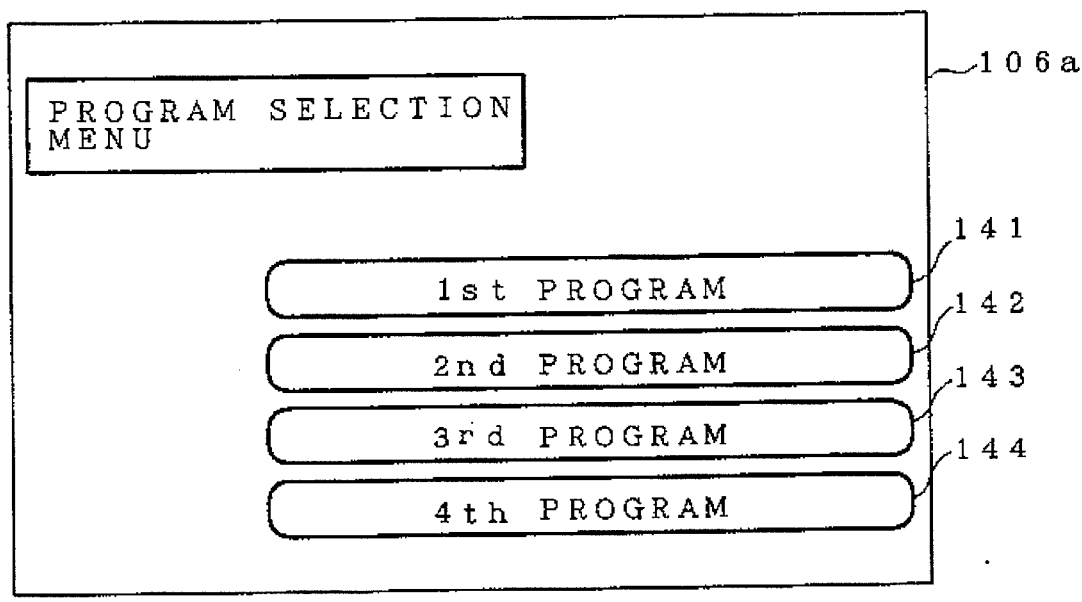
FIG. 9 shows another program selection menu displayed on the screen of the display unit shown in FIG. 1.

The operation of the program selection combined with the operation of the program error detection will be described hereinlater with reference to a flowchart shown in FIG. 7, a warning indication shown in FIG. 8 and a program selection menu shown in FIG. 9 on the assumption that a plurality Of navigation programs are stored in the external storage device 103 and that the navigation program stored in the EPROM 102f of the navigation unit 102 has error detecting and correcting codes.

First, a determination is, in a step N1, made of whether the navigation program stored in the EPROM 102f of the navigation unit 102 has an error or not, since it is possible that the navigation program stored in the EPROM 102f of the navigation unit 102 has an error caused, for example, by the program transmission. If the answer in the step N1 is in the negative "NO", namely, the navigation program stored in the EPROM 102f of the navigation unit 102 has no error, the step N1 proceeds to a step N2 in which the navigation program stored in the EPROM 102f of the navigation unit 102 is executed by the CPU 102a of the navigation unit 102 to provide the vehicle driver with the navigation information through the display unit 106. If the answer in the step N1 is in the affirmative "YES", the step N1 proceeds to a Step N3 in which a determination is made of whether the error of the navigation program store in the EPROM 102f of the navigation unit 102 is correctable or not. If the answer in the step N3 is in the affirmative "YES", the step N3 proceeds to a step N4 in which the error of the navigation program stored in the EPROM 102f of the navigation unit 102 is corrected, and subsequently the step N4 proceeds to a step N2 to execute the navigation program stored in the EPROM 102f of the navigation unit 102. The aforementioned steps N1, N3 and N4 is carried out by executing the error check correction program.

If the answer in the step N3 is in the negative "NO", the step N3 proceeds to a step N5 in which a warning indication is displayed on the screen of the display unit 106. The warning indication is shown in FIG. 8 as defining a program load touch key 121 on the screen of the display unit 106. If the program load touch key 121 on the screen of the display unit 106 is touched by the vehicle driver, the step N5 proceeds to a step N6 in which a program selection menu shown is displayed on the screen of the display unit 106. The program selection menu is shown in FIG. 9 as defining on the screen of the display unit 106 a plurality of program selection touch keys 122 to 125 each corresponding to a first to fourth navigation programs. If one of the program selection touch keys 122 to 125, for example, the program selection touch key 122 corresponding to the first navigation program is touched by the vehicle driver, the step N6 proceeds to a step N8 in which the first transmitting program is executed by the CPU 102g of the navigation unit 102 to read the first navigation program from the external storage device 103 and store the read the first navigation program in the RAM 102c of the navigation unit 102. Next, in a step N8, the determination is made of whether the first navigation program stored in the RAM 102c of the navigation unit 102 has an error or not. If the answer in the step N8 is in the affirmative "NO", the step N8 proceeds to a step N9 in which a determination is made of whether the error of the first navigation program stored in the RAM 2c of the navigation unit 102 is correctable. If the answer in the step N9 is in the affirmative "YES", the step N9 proceeds to a step N10 in which the error of the first navigation program stored in the RAM 102c of the navigation unit 102 is corrected, and subsequently the step N10 proceeds to a step N11. If, on the other hand, the answer in the step N9 is in the negative "NO", the step N9 returns to the step N7. In the step N11, the second transmitting program is executed by the CPU 102a of the navigation unit 102 to transmit the first navigation program from the RAM 102c to the EPROM 102f. As a result, the unerring navigation program stored in the EPROM 102f of the navigation unit 102 can be executed by the CPU 102a of the navigation unit 102 in the step N2 subsequent to the step N11.

As will be understood from the description of the first embodiment of the navigation system according to the present invention, the navigation program stored in the EPROM 102f of the navigation unit 102 is repeatedly executed by the CPU 102a of the navigation unit 102 after the navigation program is transmitted from the external storage device 103 to the EPROM 102f of the navigation unit 102. The navigation program stored in the EPROM 102f of the navigation unit 102 can be read out and executed quickly in comparison with the navigation program stored in the external storage device such as a CD-ROM, thereby making it possible to shorten the waiting of the vehicle driver between the time when the electric power is supplied to the navigation system and the time when the navigation information is displayed on the screen of the display unit 106.

The navigation program stored in the external storage device 103 is transmitted to the EPROM 102f of the navigation unit 102 by executing the transmitting program stored in the ROM 102d of the navigation unit 102 if the error of the navigation program stored in the EPROM 102f of the navigation unit 102 is detected by executing the error check program stored in the ROM 102d of the navigation unit 102. This means that the error of the navigation program stored in the EPROM 102f of the navigation unit 102 can be corrected automatically. In the case that the navigation program stored in the EPROM 102f of the navigation unit 102 includes the error detecting and correcting codes, the error of the navigation program stored in the EPROM 102f of the navigation unit 102 is corrected by executing the error check correction program stored in the ROM 102d of the navigation unit 102 when the error of the navigation program is correctable. On the other hand, the transmitting program stored in the ROM 102d of the navigation unit 102 is executed by the CPU 102a of the navigation unit 102 to transmit the navigation program from the external storage device 103 to the EPROM 102f of the navigation unit 102 only when the error of the navigation program stored in the EPROM 102f of the navigation unit 102 is uncorrectable. Therefore, the frequency of the execution of the transmitting program is decreased, so that it is unnecessary for the vehicle driver to wait for a long time whenever the error of the navigation program stored in the EPROM 102f of the navigation unit 102 is detected.

The navigation system is operative to permit the vehicle driver to select desirable one among from a plurality of the navigation programs stored in the external storage device 103 and utilize the selected desirable navigation program. In other words, a multi-functional navigation system can be provided on the assumption that each of the navigation programs stored in the external storage device 103 corresponds to each of a plurality of navigation functions.

The information that the error of the navigation program stored in the EPROM 102f of the navigation unit 102 is detected is transmitted to the vehicle driver through the informing means such as a display unit or a loudspeaker, thereby enabling the vehicle driver to be informed of the reason of the program transmission between the external storage device 103 and the EPROM 102f of the navigation unit 102.

The EPROM 102f can be switched from the normal mode serving as an erasable programmable read-only memory to the read-only mode serving as a read-only memory after the execution of the transmitting program. This results in the fact that the navigation program stored in the EPROM 102f of the navigation unit 102 can be prevented from being erroneously rewritten, for example, by an uncontrollable program.

Figure 10:
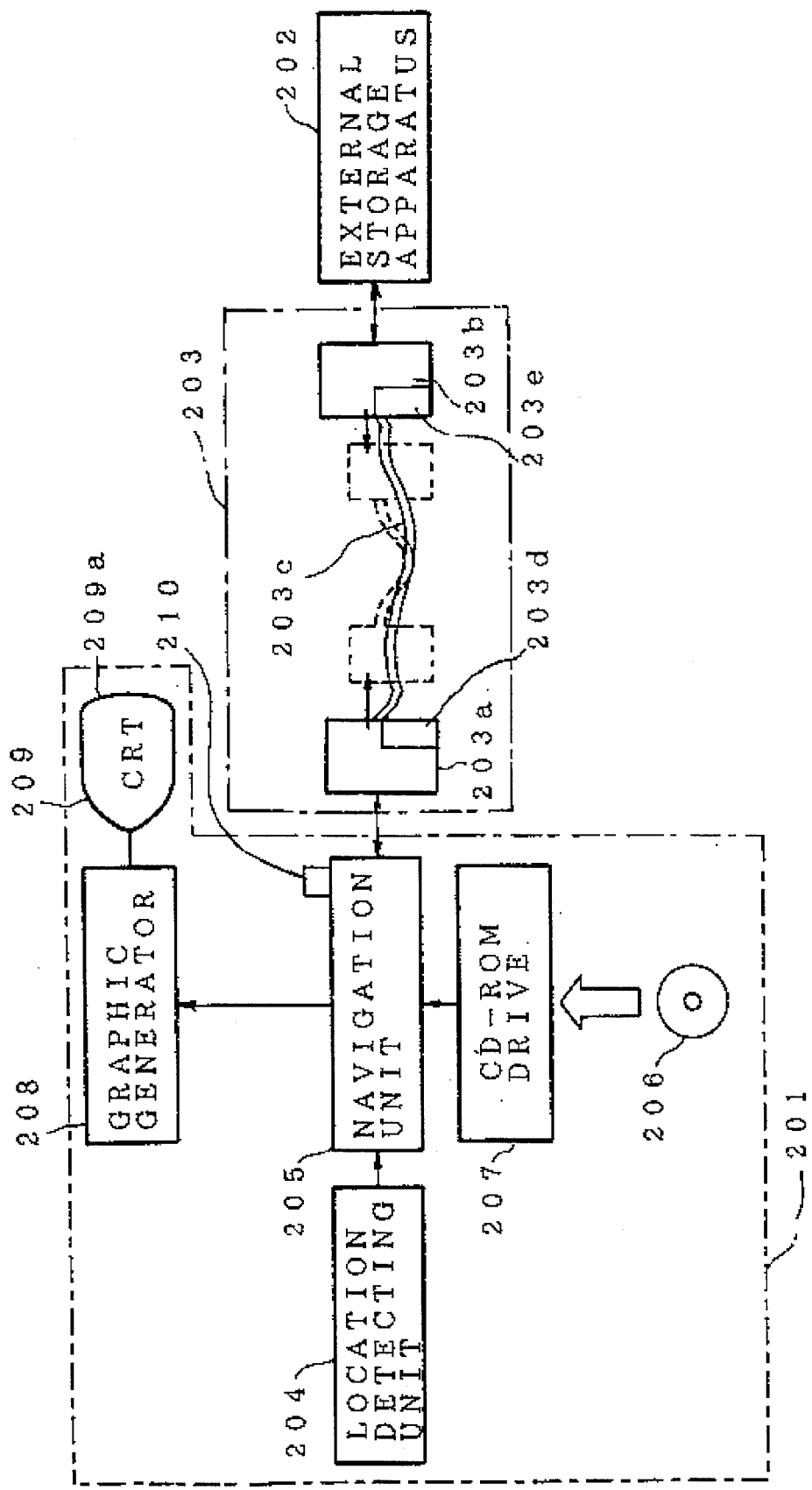
FIG. 10 shows a block diagram of a second embodiment of the navigation apparatus according to the present invention.

Referring to FIGS. 10 to 16 of the drawings, first particularly to FIG. 10 thereof, a second embodiment of a navigation system to which the present invention appertains is shown as comprising a navigation apparatus 201 mounted on a vehicle, an external storage apparatus 202 exterior to the vehicle and a communication apparatus 203 partly mounted on the vehicle and partly exterior to the vehicle. The navigation apparatus 201 comprises a location detecting unit 204 for detecting the current location of the vehicle, a navigation unit 205 for executing various programs including at least a navigation program to provide a vehicle driver with navigation information including the current location of the vehicle, an external storage device 206 such as a CD-ROM for storing digital map data base comprising road map data indicative of road maps in a predetermined area and reference data indicative of famous hotels and architectures, and a CD-ROM drive unit 207 operative to read the road map data and reference data from the external storage device 206 to feed the read road map data and reference data to the navigation unit 205.

The location detecting unit 204 is adapted to calculate an estimated vehicle location through a so-called dead-reckoning which comprises the steps of deriving output signals from a distance sensor and a heading sensor (each not shown) at regular intervals, integrating the variations of the derived output signals to produce travel data, and calculating the estimated vehicle location based on the produced travel data. The current location of the vehicle is calculated by the location detection unit 204 on the basis of the calculated estimated vehicle location through the aforesaid map matching method.

While there has been described in the above and shown in the drawings as to the fact that the current location of the vehicle is detected on the basis of outputs of a self-contained sensor system comprising the distance sensor and the heading sensor, the current location of the vehicle may be calculated depending upon a radio wave receiving system such as a GPS (Global Positioning System) or in addition to or instead of the self-contained sensor system. In the GPS, positions of the GPS satellites revolving around the earth are calculated on the basis of data sent from the GPS satellites and data concerning orbits of the GPS satellites. At the same time, propagation times necessary for the radio wave to travel from the GPS satellites, respectively, to the vehicle are measured, and subsequently the current location of the vehicle is detected on the basis of the positions of the GPS satellites and the propagation times. In addition, the current location of the vehicle can be detected depending upon radio waves sent from beacon transmitters placed at roadside.

Figure 11:
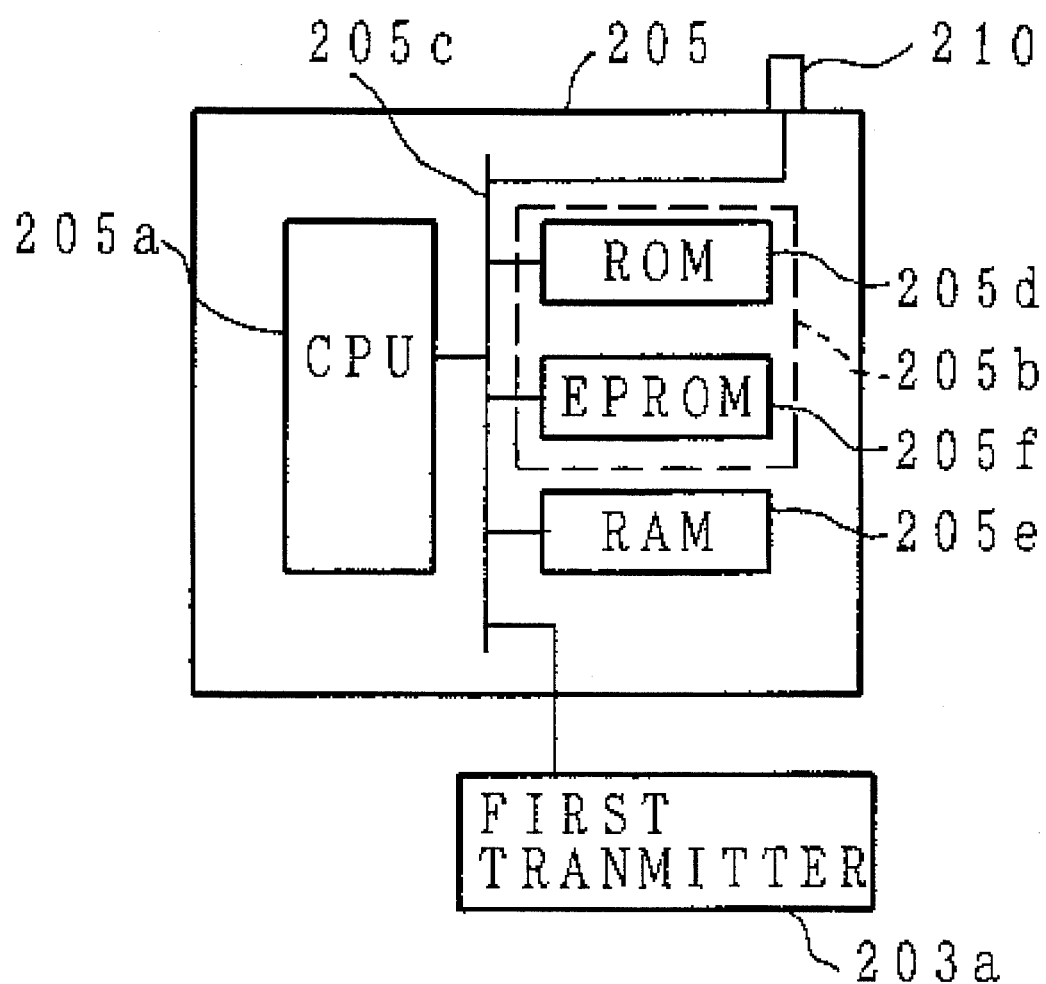
FIG. 11 shows a block diagram of a navigation unit and a first transmitter shown in FIG. 10.
Figure 12:
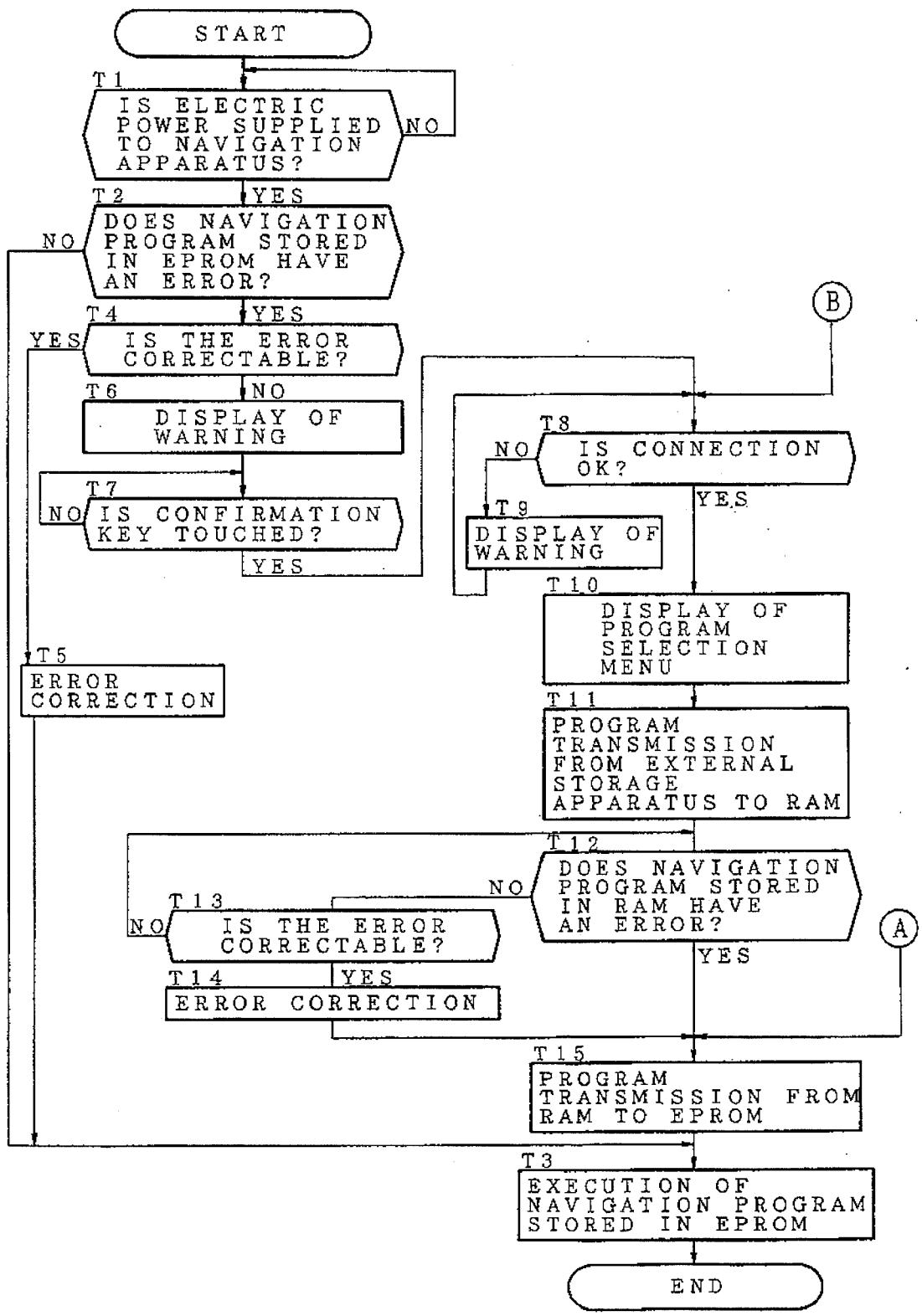
FIG. 12(a) shows a flowchart representing the operation of the navigation system shown in FIG. 10.
FIG. 12(b) shows a flowchart of a menu interruption program executed by the navigation system shown in FIG. 10.
Figure 12:
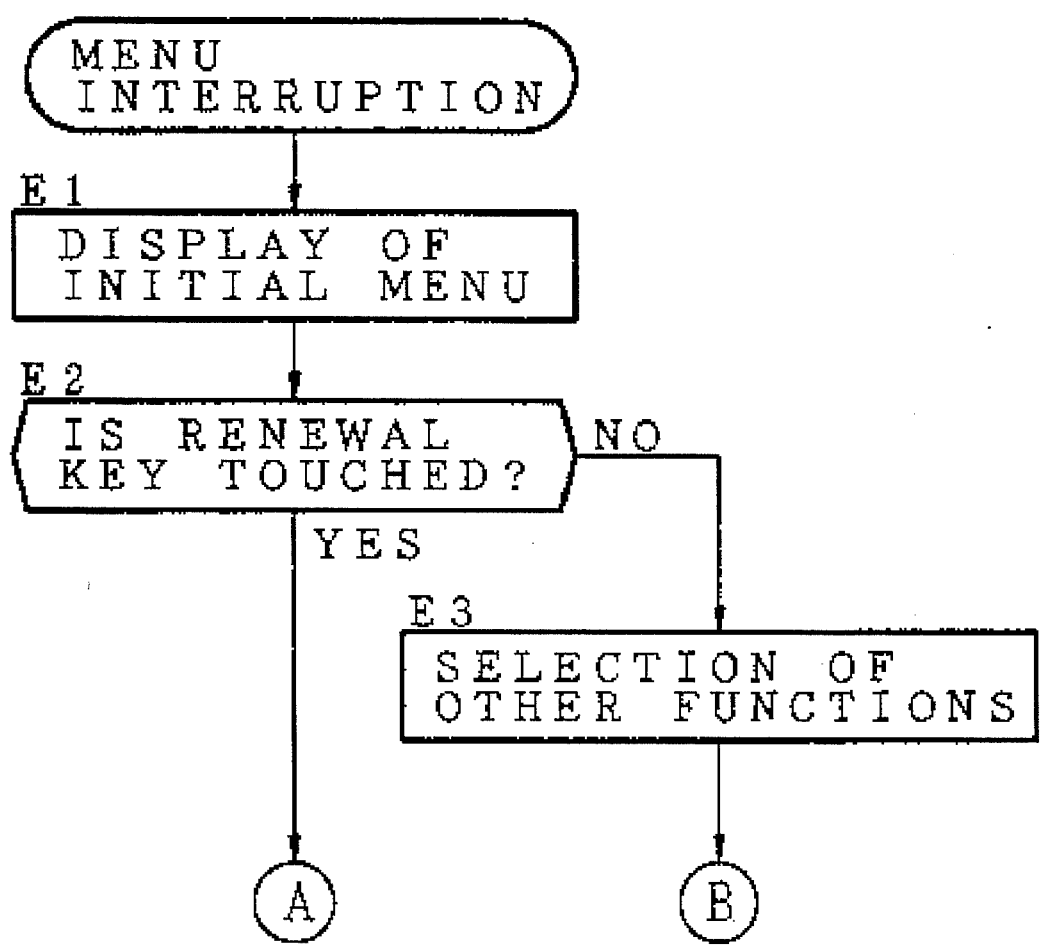

The navigation unit 205 is shown in FIG. 11 as comprising a CPU 205a for executing the various programs including at least a navigation program, a transmitting program and an error check program or an error check correction program, an internal nonvolatile storage device 205b storing therein the transmitting program and the error check program and the error check correction program, a RAM 205e for temporarily storing the programs and calculation data, and an inner bus 205c including an address bus, a control bus and data bus and having the CPU 205a, the internal nonvolatile storage device 205b and the RAM 205e electrically connected to one another to permit signals to be transmitted between the CPU 205a and the internal nonvolatile storage device 205b, between the CPU 205a and the RAM 205e and between the internal nonvolatile storage device 205b and the RAM 205e. Although the CD-ROM drive unit 207 is not shown in FIG. 11, the CD-ROM drive unit 207 is adapted to be electrically connected to the inner bus 205c of the navigation unit 205 through an interface unit (not shown), thereby permitting the external storage device 206 to be brought into communication with the CPU 205a, the internal nonvolatile storage device 205b and the RAM 205e of the navigation unit 205.

Turning back to FIG. 10, the external storage apparatus 202 exterior to the vehicle is laid in a specific shop or store, a service center, a gas station or the like and rented by the user of the navigation apparatus 201, or utilized by the user without charge. The communication apparatus 203 is shown in FIG. 10 as comprising a first transmitter 203a mounted on the vehicle and electrically connected to the inner bus 205c of the navigation unit 205 through an interface unit (not shown), a second transmitter 203b exterior to the vehicle and electrically connected to the external storage apparatus 202. The communication apparatus 203 further comprises a communication cable 203c having a first connecter 203d at its one end and a second connecter 203e at its the other end, the first connecter 203d of the communication cable 203c being detachably and electrically connected to the first transmitter 203a of the communication apparatus 203, and the second connecter 203e of the communication cable 203c being detachably and electrically connected to the second transmitter 203b of the communication apparatus 203. In the navigation system thus constructed, the navigation unit 205 and the external storage apparatus 202 are held in communication with to each other through the communication apparatus 203 while the first and second connecters 203d and 203e of the communication cable 203c are attached to the first and second transmitters 203a and 203b, respectively, of the communication apparatus 203.

The internal nonvolatile storage device 205b of the navigation unit 2 is shown in FIG. 11 as comprising a ROM 205f for storing therein transmitting program and an erasable programmable read-only memory 205f (hereinlater simply referred to as "EPROM") such as an electrically erasable programmable read-only memory (EEPROM) or a flash memory (FROM). The CPU 205a of the navigation unit 205 is initially operated to execute the transmitting program to read the navigation program from the external storage apparatus 202 through the communication apparatus 203 and store the read navigation program in the EPROM 205f of the navigation unit 205, and subsequently operated to repeat the execution of the navigation program stored in the EPROM 205f of the navigation unit 205 to provide the vehicle driver with the navigation information including the current location of the vehicle and the road map around the current vehicle location. More specifically, the transmitting program comprises a first transmitting program for reading the programs from the external storage apparatus 202 to store the read programs to the RAM 205e of the navigation unit 205, and a second transmitting program for reading the programs from the RAM 205e of the navigation unit 205 to store the read programs to the EPROM 205f of the navigation unit 205. The first transmitting program is firstly executed by the CPU 205a of the navigation unit 205 to read the navigation program from the external storage apparatus 203 and store the read navigation program in the RAM 205e of the navigation unit 205, if the navigation apparatus 201 is used for the first time. At this time, the navigation program is stored in the RAM 205e of the navigation unit 205 so as to include error detecting codes for making it possible to detect the error of the navigation program. The second load program is executed by the CPU 205a of the navigation unit 205 at the predetermined time after the execution of the first transmitting program to read the navigation program stored in the RAM 205e of the navigation unit 205 and store the read navigation program in the EPROM 205f of the navigation unit 205. The navigation program stored in the RAM 205e of the navigation unit 205 is erased after the navigation program is stored in the EPROM 205f of the navigation unit 205, whereas the navigation program stored in the EPROM 205f of the navigation unit 205 is not erased if the electric power supplied to the navigation apparatus 201 is shut off.

Although the internal storage device 205b of the navigation unit 205 comprises the ROM 205d storing the transmitting program therein and the EPROM 205f in the explanation described hereinbefore, the internal storage device 205b of the navigation unit 205 may comprise an EPROM serving as both the ROM 205d and the EPROM 205f.

The ROM 205d of the navigation unit 205 further stores an error check program to be executed by the CPU 205a of the navigation unit 205 to detect the error of the navigation program stored in the EPROM 205f of the navigation unit 205 on the basis of the error detecting codes of the navigation program. The CPU 205a of the navigation unit 205 is operated to execute the transmitting program to read the navigation program from the external storage apparatus 202 and store the read navigation program in the EPROM 205f of the navigation unit 205 when the error of the navigation program stored in the EPROM 205f of the navigation unit 205 is detected by executing the error check program. This means that the erroneous navigation program stored in the EPROM 205g is replace with a correct navigation program. The error detecting codes are defined, for example, by cyclic redundancy characters or checksums.

Although the navigation program is stored in the RAM 205e of the navigation unit 205 so as to include error detecting codes by the execution of the first load program in the aforesaid description, the navigation program can be stored in the RAM 205e of the navigation unit 205 so as to include error detecting and correcting codes in place of the error detecting codes. In this case, the ROM 205d of the navigation unit 205 stores an error check correction program in place of the error check program. When the error check correction program is executed by the CPU 205a of the navigation unit 205, the error of the navigation program is detected on the basis of the error detecting and correcting codes of the navigation program, and subsequently a determination is made of whether the detected error of the navigation program is correctable or not. The detected error of the navigation program stored in the EPROM 205f of the navigation unit 205 is corrected when the detected error of the navigation program is correctable. When, on the other hand, the detected error of the navigation program is uncorrectable, the CPU 205a of the navigation unit 205 is further operated to execute the first and second load programs to read the navigation program from the external storage apparatus 202 and store the read navigation program in the EPROM 205f of the navigation unit 205. This results in the fact that the uncorrectable navigation program stored in the EPROM 205f is replace with a correct navigation program. The above mentioned error detecting and correcting codes are defined, for instance, by Hamming codes.

The navigation apparatus 201 is shown in FIG. 10 as further comprising a graphic generator 208 for generating graphic data based on the output signal of the navigation unit 205, and a display unit 209 such as a CRT for displaying, on its screen 209a, various information in accordance with the generated graphic data. The various information comprises information as to the current location of the vehicle and the road map around the current position of the vehicle, information that the error of the navigation program stored in the EPROM 205f of the navigation unit 205 is detected, and information as to a program management and a program selection described hereinlater. The information that the error of the navigation program stored in the EPROM 205f of the navigation unit 205 is detected may be voiced by a loudspeaker unit (not shown) in addition to or in place of the display unit 209.

Figure 16:
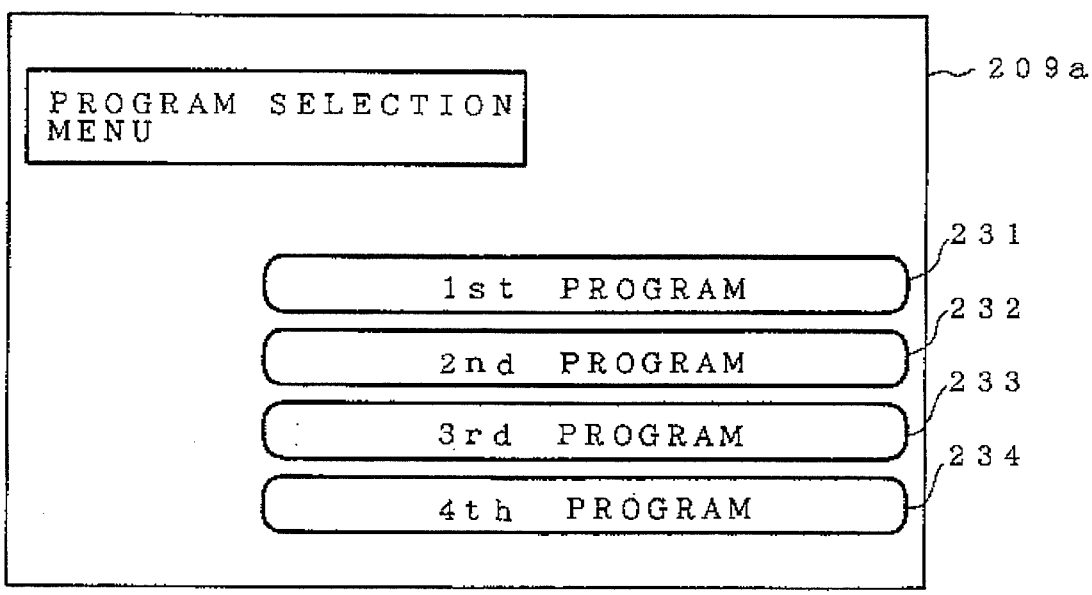
FIG. 16 shows a program selection menu displayed on the screen of the display unit shown in FIG. 10.

In the meantime, the ROM 205f of the navigation unit 205 further stores therein a selection program in the case which a plurality of navigation programs is stored in the external storage apparatus 202. If the selection programs is executed by the CPU 205a of the navigation unit 205 before the execution of the transmitting program stored in the ROM 205d of the navigation unit 205, a program selection menu shown in FIG. 16 is displayed on the screen 209a of the display unit 209. The vehicle driver can select a desirable program from the navigation programs by touching one of touch keys 231 to 234 corresponding to first to fourth navigation programs, respectively.

The EPROM 205f of the navigation unit 205 is operative to assume two different operation modes consisting of a normal mode serving as an erasable programmable read-only memory and a read-only mode serving as a read-only memory. The navigation apparatus 201 is shown in FIG. 10 as further comprising a mode selection switch which operated by the vehicle driver to switch the EPROM 205f between the normal mode and the read-only mode. Instead of the mode selection switch 210 may be used a mode switch program which is stored in the ROM 205d of the navigation unit 205 and automatically executed by the CPU 205a of the navigation unit 205 to switch the EPROM 205f of the navigation unit 205 from the normal mode to the read-only mode after the execution of the transmitting program.

The operation of the program selection combined with the program error detection will be described hereinafter with reference to a flowchart shown in FIG. 12(a) and warning indications and display menus shown in FIGS. 13 to 16 on the assumption that a navigation program is already transmitted from the external storage apparatus 202 to the EPROM 205f of the navigation unit 205 and that a plurality of navigation programs are stored in the external storage apparatus 202.

In a step T1, a determination is made of the whether or not the electric power is applied to the navigation apparatus 201. If the answer in the step T1 is in the affirmative "YES", the step T1 proceeds to a step T2 in which a determination is made of whether or not the navigation program stored in the EPROM 205f of the navigation unit 205 has an error. If the answer in the step T2 is in the negative "NO", i.e., the navigation program has no error, the step T2 proceeds to a step T3 in which the navigation program stored in the EPROM 205f of the navigation unit is executed by the CPU 205a of the navigation unit 205 to provide the vehicle driver with the navigation information including the current location of the vehicle and a road map around the current location. If, on the other hand, the answer in the step T2 is in the negative "NO", i.e., if the navigation program stored in the EPROM 2g of the navigation unit 205 has an error, the step T2 proceeds to a step T4 in which a determination is made of whether or not the error of the navigation program stored in the EPROM 205f of the navigation unit 205 is correctable. If the answer in the step T4 is in the affirmative "YES", the step T4 proceeds to a step T5 in which the error of the navigation program stored in the EPROM 205f of the navigation unit 205 is corrected, and subsequently the step T5 proceeds to a step T3 to execute the navigation program stored in the EPROM 205f of the navigation unit 205.

Figure 13:
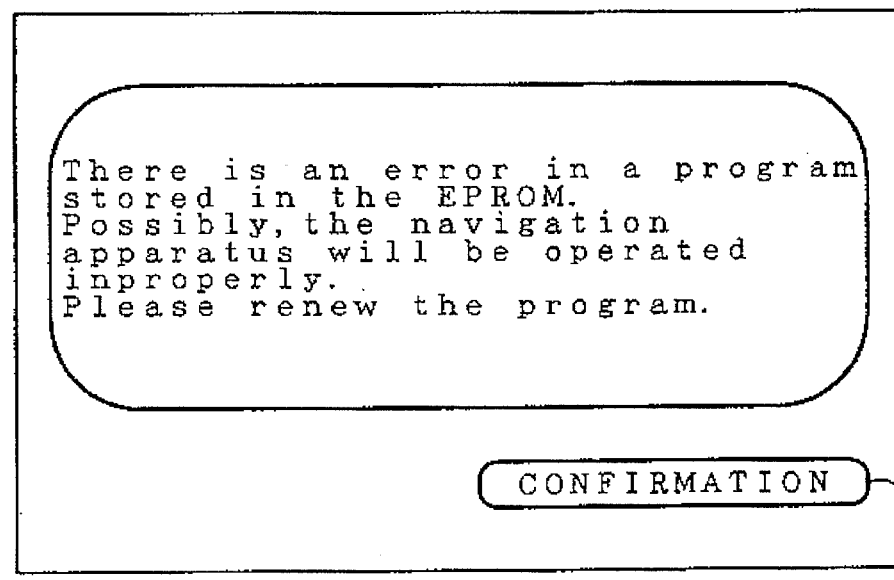
FIG. 13 shows a warning indication displayed on a screen of a display unit shown in FIG. 10.

If the answer in the step T4 is in the negative "NO", i.e., if the error of the navigation program stored in the EPROM 2g of the navigation unit 205 is uncorrectable, the step T4 proceeds to a step T6 in which a first warning indication shown in FIG. 13 is displayed on the screen 209a of the display unit 209 in order to provide the vehicle driver with the information that the error of the navigation program stored in the EPROM 205f of the navigation unit 205 was detected and that the navigation program should be transmitted from the external storage device 202 to the EPROM 205f of the navigation unit 205. The warning indication is shown in FIG. 13 as defining a confirmation touch key 221 on the screen of the display unit 207. In a step T7, a determination is made of whether or not the confirmation touch key 221 is touched by the vehicle driver. If the answer in the step T7 is in the affirmative "YES", the step T7 proceeds to a step T8 in which the navigation apparatus 201 is held in communication with the external storage apparatus 202 through the communication apparatus 203. If the answer in the step T8 is in the negative "NO", the step T8 proceeds to a step T9 in which a second warning indication is displayed on the screen 209a of the display unit 209 in order to providing the vehicle driver with the information that the external storage apparatus 202 is not connected to the navigation apparatus 201 and that the vehicle driver should confirm whether the external storage apparatus 202 is connected to the navigation apparatus 201 or not. The step T9 returns to the step T8, however the second warning indication in the step T8 is not erased the screen of the display unit 207 until the external storage apparatus 202 is connected to the navigation apparatus 201.

If the answer in the step T8 is in the affirmative "YES", i.e., the external storage apparatus 202 is connected to the navigation apparatus 201, the step T8 proceeds to a step T10 in which a program selection menu is displayed on the screen 209a of the display unit 209. The program selection menu is shown in FIG. 16 as defining, on the screen 209a of the display unit 209, a plurality of program selection touch keys 231 to 234 each corresponding to first to fourth navigation programs. If one of the program selection touch keys 231 to 234, for example, the program selection touch key 234 corresponding to the first navigation program is touched by the vehicle driver, the step T10 proceeds to a step T11 in which the first transmitting program stored in the ROM 205d is executed by the CPU 205a of the navigation unit 205 to read the first navigation program from the external storage apparatus 202 and store the read the first navigation program in the RAM 205e of the navigation unit 205. Although the step T10 proceeds the step T11 by way of the step T10, the step T10 may proceeds directly the step T11. In this instance, a navigation program corresponding to the erroneously navigation program stored in the EPROM 205f of the navigation unit 205 is automatically transmitted from the external storage apparatus 202 to the RAM 205e of the navigation unit 205 in the step T11.

Next a determination, in a step T12, is made of whether the first navigation program stored in the RAM 205e of the navigation unit 205 has an error or not. If the answer in the step T12 is in the negative "NO", the step T12 proceeds to a step T13 in which a determination is made of whether or not the error of the first navigation program stored in the RAM 205e of the navigation unit 205 is correctable. If the answer in the step T13 is in the affirmative "YES", the step T13 proceeds to a step T14 in which the error of the first navigation program stored in the RAM 205e of the navigation unit 205 is corrected, and then the step T16 proceeds to a step T15. If, on the other hand, the answer in the step T13 is in the negative "NO", the step T13 returns to the step T12. In the step T15, the second transmitting program stored in the ROM 205d of the navigation unit 205 is executed by the CPU 102a of the navigation unit 102 to transmit the first navigation program from the RAM 205e to the EPROM 205f. As a consequence, the unerring navigation program can be executed by the CPU 205a of the navigation unit 205 in the step T3.

Figure 14:
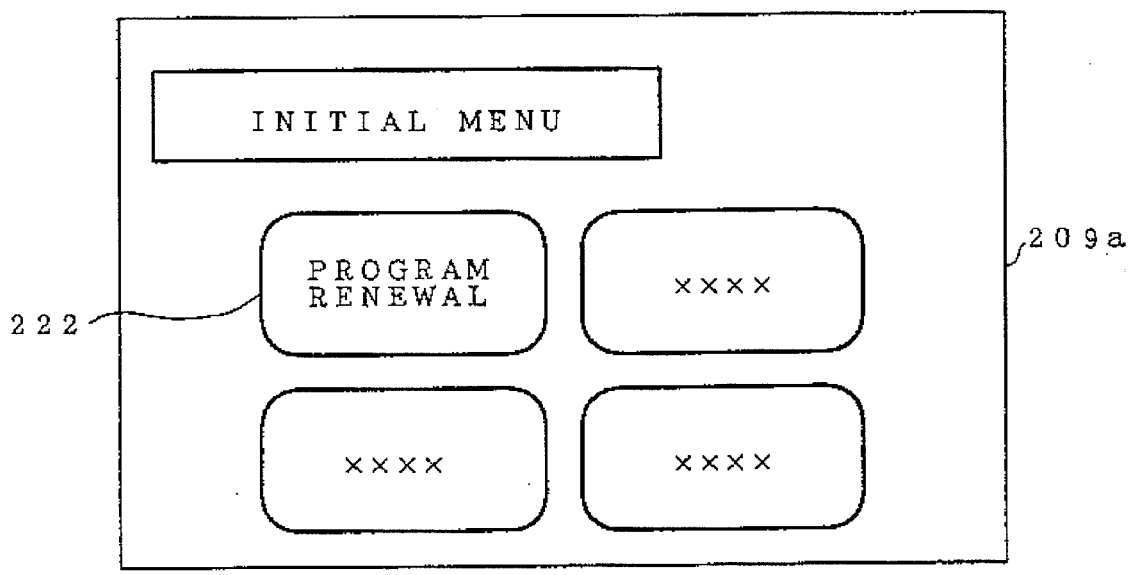
FIG. 14 shows a program management menu displayed on the screen of the display unit shown in FIG. 10.
Figure 15:
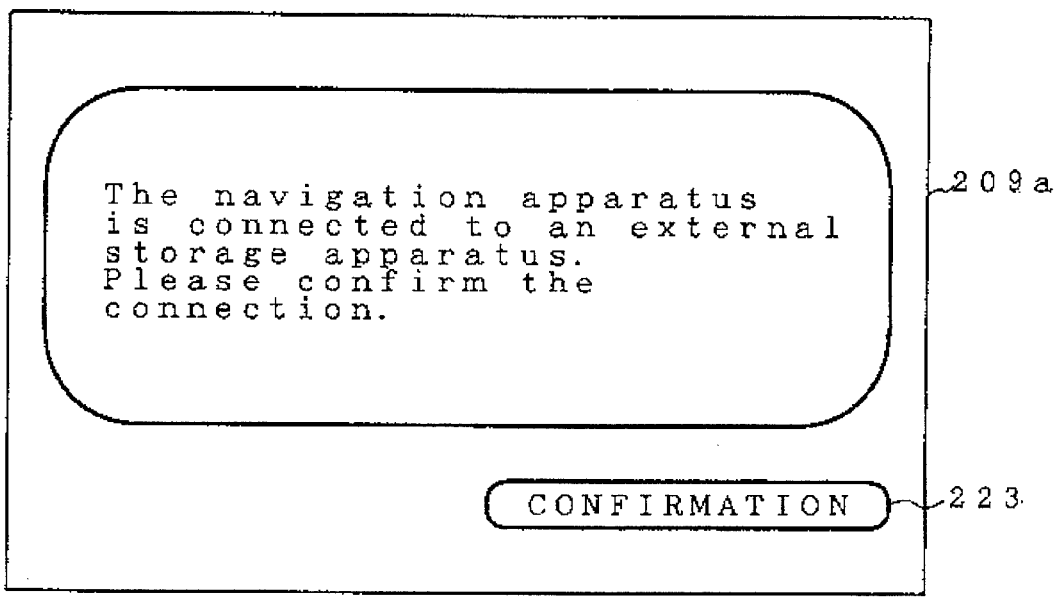
FIG. 15 shows another warning indication displayed on the screen of the display unit shown in FIG. 10.

In the meantime, the navigation apparatus 201 comprises a menu interruption key (not shown) for interrupting the current operation of the navigation apparatus 201 and display an initial menu shown on the screen 209a of the display unit 209, and a navigation interruption key (not shown) for interrupting the current operation of the navigation apparatus 201 and executing the navigation program stored in the EPROM 205f of the navigation unit 205. The initial menu is shown in FIG. 14 as defining a program renewal touch key 222 on the screen 209a of the display unit 209. If the menu interruption key is operated by the vehicle driver, the operation shown in FIG. 12(b) is carried out. In a step E1, the initial menu shown in FIG. 14 is displayed on the screen 209a of the display unit 209, and the step E1 proceeds a step E2 in which a determination is made of whether or not the program renewal key is touched by the vehicle driver. If the answer in the step E2 is in the affirmative "YES", the step E2 proceeds to the step T8 of FIG. 12(a) through a connector B. If the answer in the step E2 is in the negative "NO", the step E2 proceeds a step E3 in which one of other functions is selected, i.e., one of other keys defined in the initial menu on the screen 209a of the display unit 209 is touched by the vehicle driver. Next, the step E3 proceeds the step T3 of FIG. 12(a) through a connector A.

As will be understood from the description of the second embodiment of the navigation system according to the present invention, the navigation program stored in the EPROM 205f of the navigation unit 205 is repeatedly executed by the CPU 205a of the navigation unit 205 after the navigation program is transmitted from the external storage apparatus 202 to the EPROM 205f of the navigation unit 205. The navigation program stored in the EPROM 205f of the navigation unit 205 can be read out and executed quickly in comparison with the navigation program stored in the external storage device such as a CD-ROM, thereby making it possible to shorten the waiting of the vehicle driver between the time when the electric power is supplied to the navigation system and the time when the navigation information is displayed on the screen 209a of the display unit 209.

The external storage apparatus 202 exterior to the vehicle is laid in a specific shop or store, a service center, a gas station or the like and can be rented by the user of the navigation apparatus 201, or utilized by the user without charge as above mentioned. If the user of the navigation apparatus or the vehicle driver hopes to utilize a new version of the navigation program or other navigation programs, it is unnecessary for the user or the vehicle driver to purchase an expensive storage device such as a CD-ROM storing therein the new version of the navigation program or other navigation programs, and to be requested to the difficult work for the exchange of the storage device.

The navigation program stored in the external storage apparatus 202 is transmitted to the EPROM 205f of the navigation unit 205 by executing the transmitting program stored in the ROM 205d of the navigation unit 205 if the error of the navigation program stored in the EPROM 205f of the navigation unit 205 is detected by executing the error check program stored in the ROM 205d of the navigation unit 205. This means that the error of the navigation program stored in the EPROM 205f of the navigation unit 205 can be corrected automatically. In the case that the navigation program stored in the EPROM 205f of the navigation unit 205 includes the error detecting and correcting codes, the error of the navigation program stored in the EPROM 205f of the navigation unit 205 is corrected by executing the error check correction program stored in the ROM 205d of the navigation unit 205 when the error of the navigation program is correctable. On the other hand, the transmitting program stored in the ROM 205d of the navigation unit 205 is executed by the CPU 205a of the navigation unit 205 to transmit the navigation program from the external storage apparatus 202 to the EPROM 205f of the navigation unit 205 only when the error of the navigation program stored in the EPROM 205f of the navigation unit 205 is uncorrectable. Therefore, the frequency of the execution of the transmitting program is decreased, so that it is unnecessary for the vehicle driver to wait for a long time whenever the error of the navigation program stored in the EPROM 102f of the navigation unit 102 is detected.

The navigation system is operative to permit the vehicle driver to select desirable one among from a plurality of the navigation programs stored in the external storage device 108 and utilize the selected desirable navigation program. In other words, a multi-functional navigation system can be provided on the assumption that each of the navigation programs stored in the external storage device 103 corresponds to each of a plurality of navigation functions.

The information that the error of the navigation program stored in the EPROM 205f of the navigation unit 205 is detected is transmitted to the vehicle driver through the informing means such as a display unit or a loudspeaker, thereby enabling the vehicle driver to be informed of the reason of the program transmission between the external storage device 202 and the EPROM 205f of the navigation unit 205.

The EPROM 205f can be switched from the normal mode serving as an erasable programmable read-only memory to the read-only mode serving as a read-only memory after the execution of the transmitting program. This results in the fact that the navigation program stored in the EPROM 205f of the navigation unit 205 can be prevented from being erroneously rewritten, for example, by an uncontrollable program.

Figure 17:
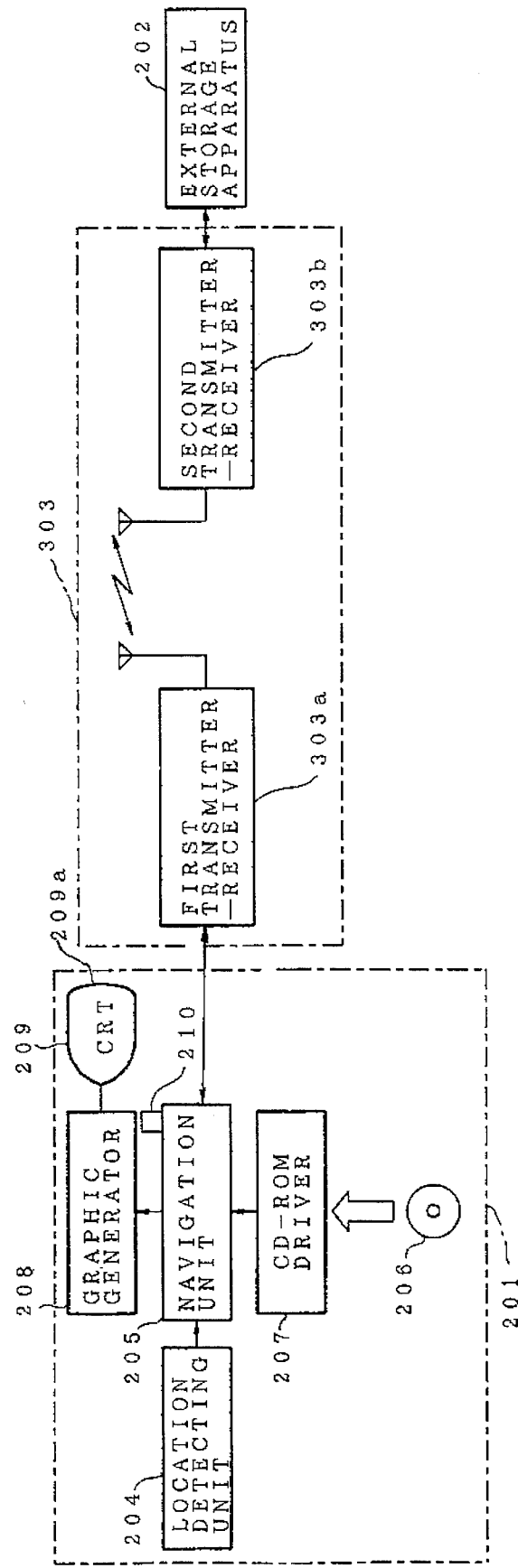
FIG. 17 shows a block diagram of a third embodiment of the navigation apparatus according to the present invention.
Figure 18:
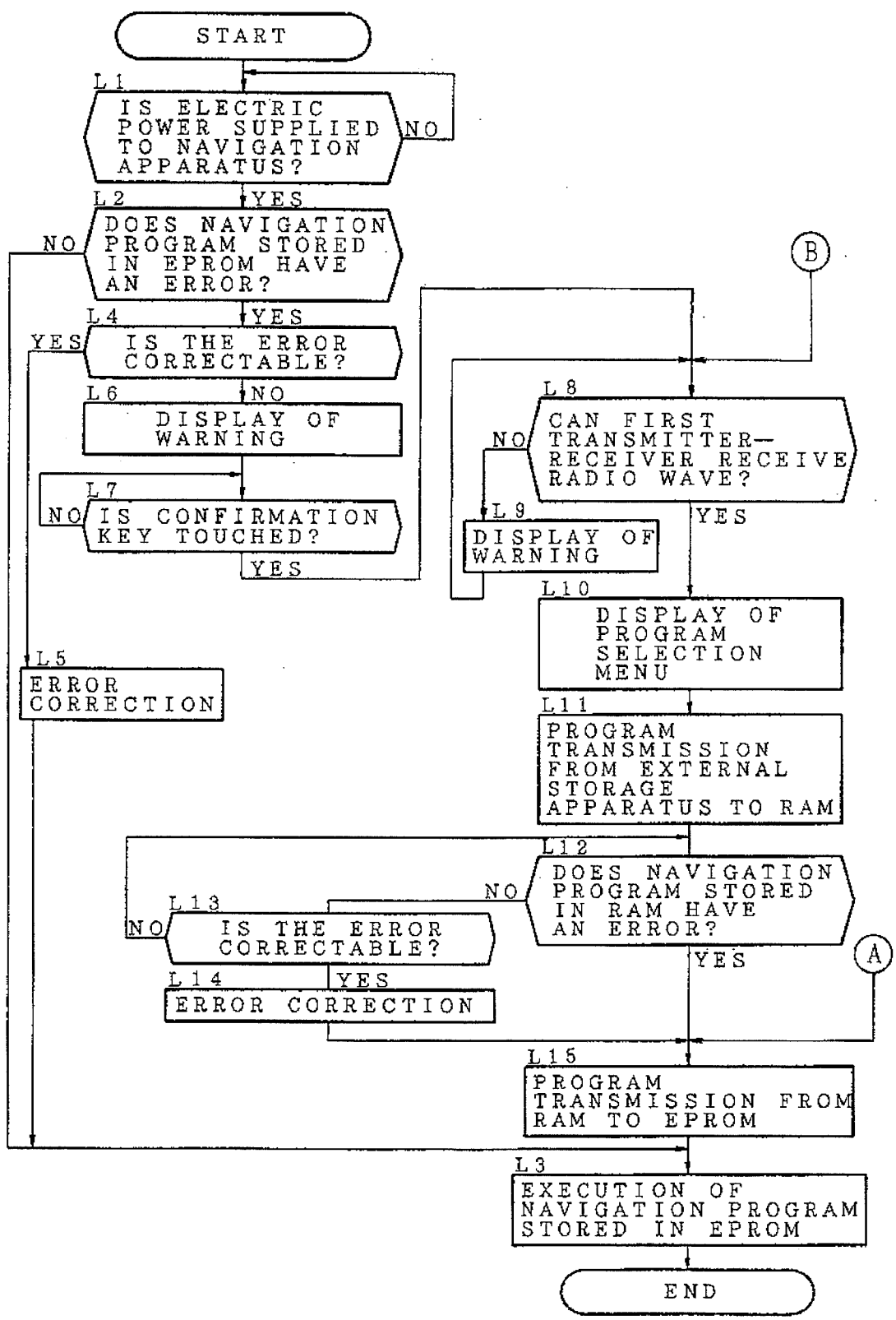
FIG. 18 shows a flowchart representing the operation of the navigation system shown in FIG. 17.

FIGS. 17 and 18 show a third embodiment of the navigation system according to the present invention. The navigation system in the third embodiment comprises a communication apparatus 303 and is constructed in similar manner to that of the aforesaid second embodiment except for the difference in construction and operation between the communication apparatus 203 of the second embodiment and the communication apparatus 303. For this reason, the following description will be merely and briefly made regarding the communication apparatus 303.

The communication apparatus 303 is shown in FIG. 17 as comprising a first transmitter-receiver 303a mounted on the vehicle so as to be electrically connected to the navigation unit 205 through an interface unit (not shown), and a second transmitter-receiver 303b exterior to the vehicle and electrically connected to the external storage apparatus 202. In the navigation system thus constructed, the navigation apparatus 201 can be held in two-way radio communication with the external storage apparatus 202 through the first and second transmitter-receivers 303a and 303b of the communication apparatus 303. The second transmitter-receiver 303b is adapted to continually emit the radio wave, or to emit the radio wave for a predetermined period at regular intervals.

FIG. 18 shows a flowchart representing the operation of the navigation system shown in FIG. 17, and having steps L1 to L7 and L9 to L15 similar to the steps T1 to T7 and T9 to T15 in FIG. 12(a), respectively, and a step L8 different from the step T8 in FIG. 12(a). In the step L8, a determination is made of whether or not the first transmitter-receiver 303a is receiving the radio wave from the transmitter-receiver 303b since it is possible that vehicle is located in an area within which the first transmitter-receiver 303a cannot receive the radio wave from the second transmitter-receiver 303b. If the answer in the step L8 is in the affirmative "YES", the step L8 proceeds to the step L10. If, reversely, the answer in the step L8 is in the negative "NO", the step L8 proceeds to the step L9.

In the third embodiment of the navigation system according to the present invention, the navigation apparatus 201 can be held in two-way radio communication with the external storage apparatus 202 through the first and second transmitter-receivers 303a and 303b of the communication apparatus 303. Therefore, the user of the navigation apparatus or the vehicle driver can utilize a new version of the navigation program or other navigation programs without renting the external storage apparatus storing therein such navigation programs, if the user of the navigation apparatus or the vehicle driver hopes to utilize such navigation programs.

Figure 19:
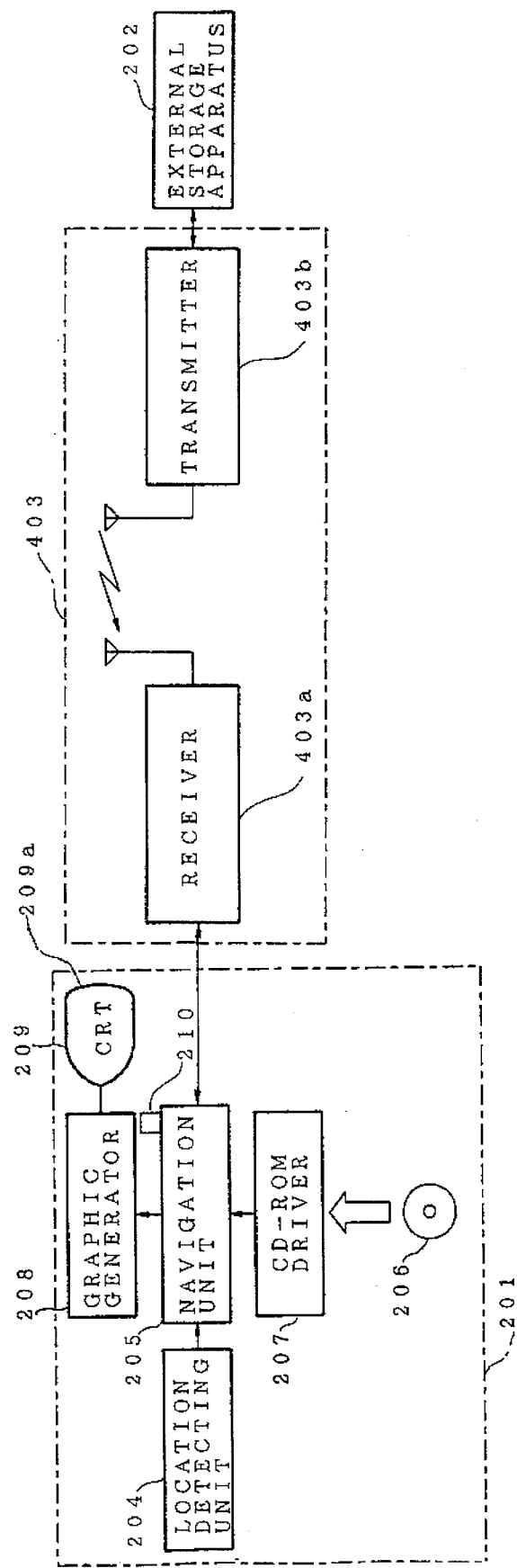
FIG. 19 shows a block diagram of a fourth embodiment of the navigation system according to the present invention.
Figure 20:
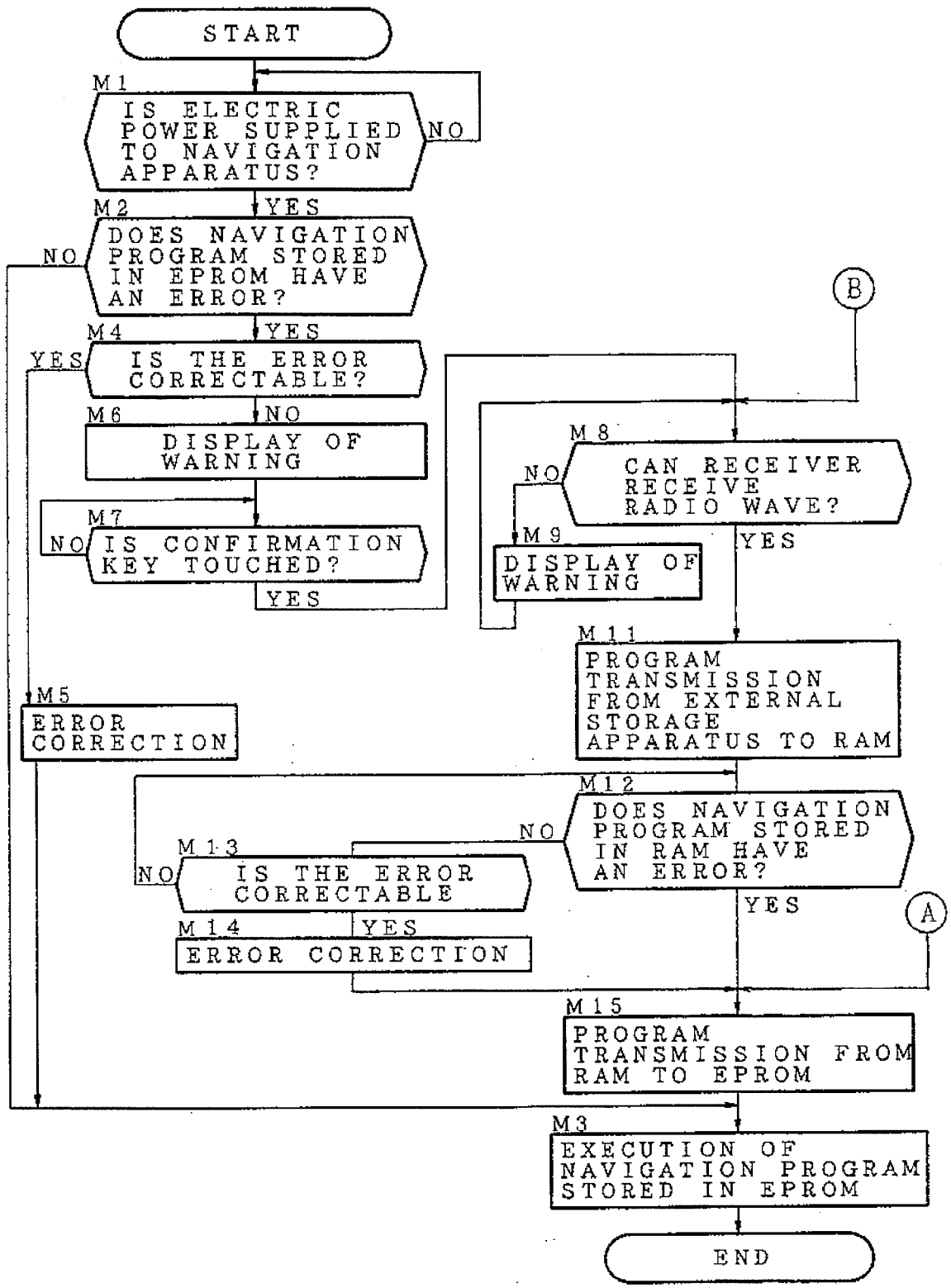
FIG. 20 shows a flowchart representing the operation of the navigation system shown in FIG. 19.

FIGS. 19 and 20 show a fourth embodiment of the navigation system according to the present invention. The navigation system in the fourth embodiment comprises a communication apparatus 403 and is constructed in similar manner to that of the aforesaid second embodiment except for the difference in construction and operation between the communication apparatus 303 of the third embodiment and the communication apparatus 403. For this reason, the following description will be merely and briefly made regarding the communication apparatus 403.

The communication apparatus 403 is shown in FIG. 19 as comprising a receiver 403a mounted on the vehicle as to be electrically connected to the navigation unit 205 through an interface unit (not shown), and a transmitter 403b exterior to the vehicle and electrically connected to the external storage device 202. In the navigation system thus constructed, the CPU 205a and the internal storage device 205b of the navigation unit 205 are held in one-way radio communication with the external storage device 202 through the transmitter 403a and the receiver 403b of the communication apparatus 403. The navigation system shown in FIG. 19 is operated on the assumption that the external storage device 202 stores only one navigation program because of the fact that program selection signals cannot be transmitted from the receiver 403a to the transmitter 403b. The transmitter 403b is adapted to continually emit the radio wave, or to emit the radio wave for a predetermined period at regular intervals.

FIG. 20 shows a flowchart representing the operation of the navigation system shown in FIG. 19, and having steps M1 to M9 and M11 to M15 similar to the steps L1 to L9 and L11 to L15 in FIG. 18, respectively. In the fourth embodiment of the navigation system, there is no step corresponding to the step L10 of the third embodiment shown in FIG. 18. If the answer in the step M8 is in the affirmative "YES", the step M8 proceeds to the step M11.

In the fourth embodiment of the navigation system according to the present invention, the navigation apparatus 201 can be held in two-way radio communication with the external storage apparatus 202 through the receiver 403a and a transmitter 403b of the communication apparatus 403. Therefore, the user of the navigation apparatus or the vehicle driver can utilize a new version of the navigation program without renting the external storage apparatus storing therein such a navigation program, if the user of the navigation apparatus or the vehicle driver hopes to utilize such a navigation program.

Figure 21:
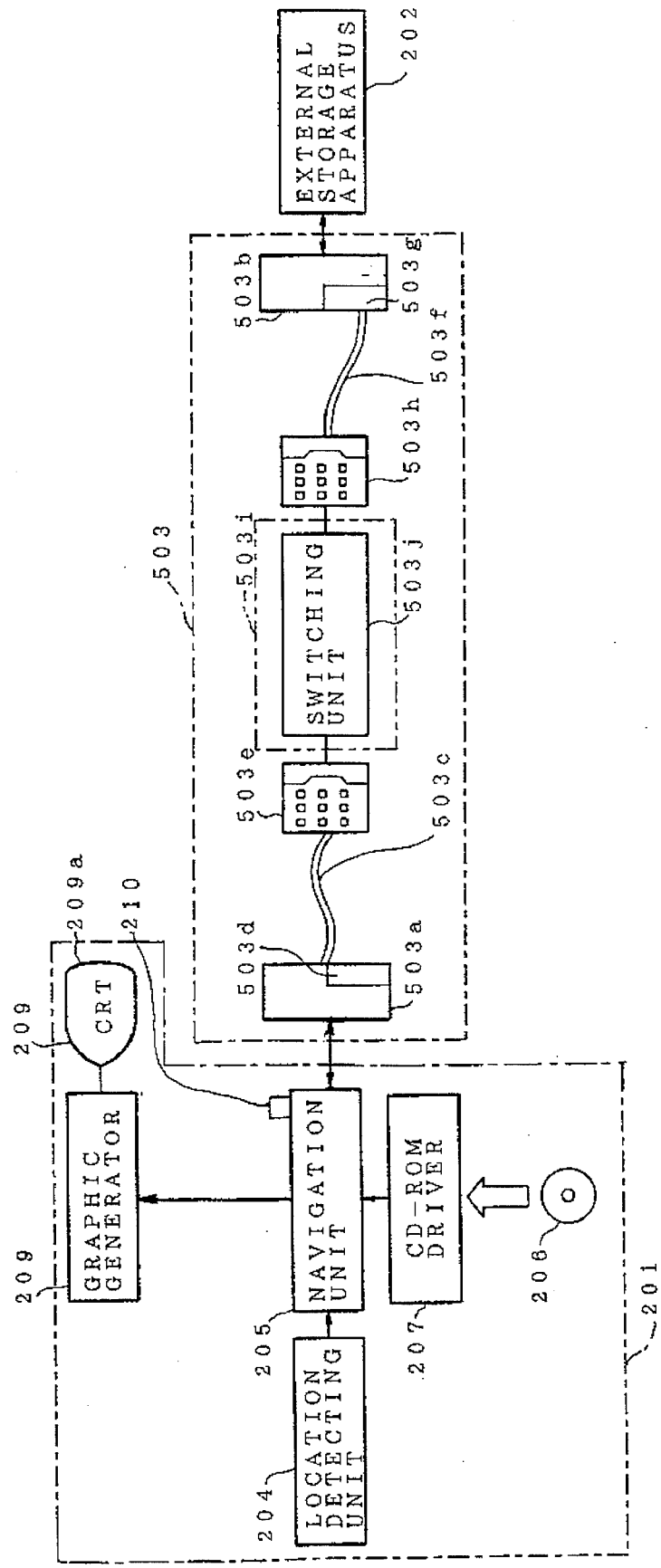
FIG. 21 shows a block diagram of a fifth embodiment of the navigation system according to the present invention.
Figure 22:
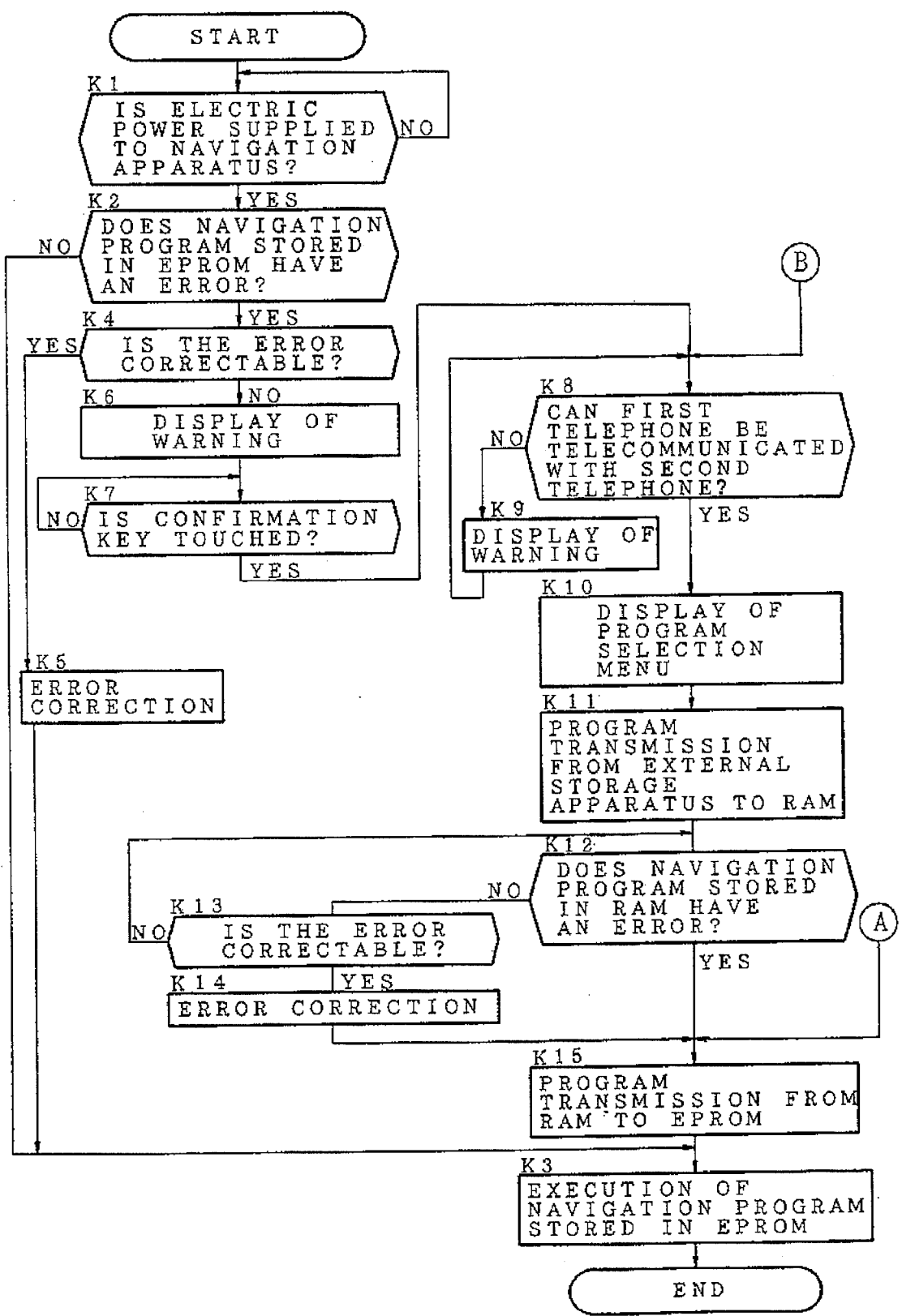
FIG. 22 shows a flowchart representing the operation of the navigation system shown in FIG. 21.
Figure 23:
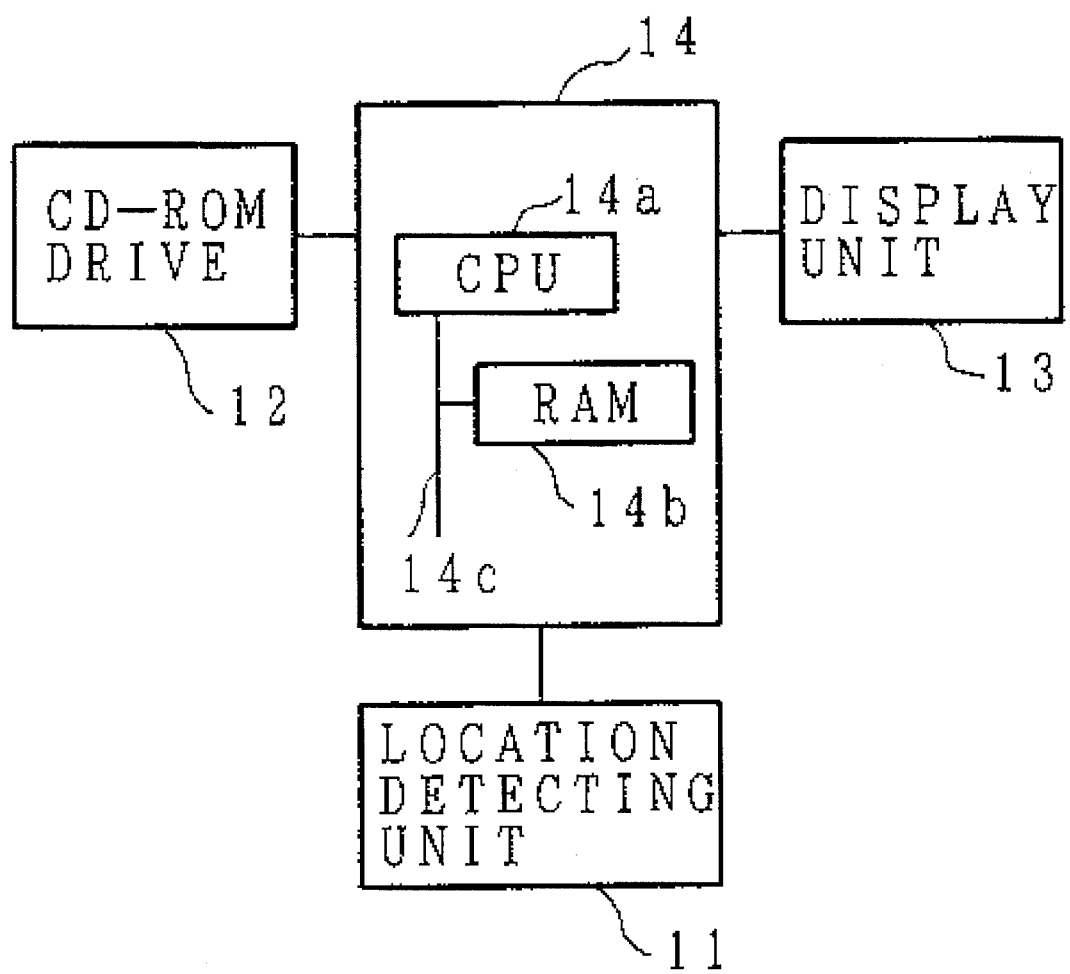
FIG. 23 shows a block diagram of a prior-art navigation system.

FIGS. 21 and 22 show a fifth embodiment of the navigation system according to the present invention. The navigation system in the fifth embodiment comprises a communication apparatus 503 and is constructed in similar manner to that of the aforesaid second embodiment except for the difference in construction and operation between the communication apparatus 203 of the second embodiment and the communication apparatus 503. For this reason, the following description will be merely and briefly made regarding the communication apparatus 503.

The communication apparatus 503 is shown in FIG. 21 as comprising a first modulator-demodulator 503a mounted on the vehicle so as to be electrically connected to the navigation apparatus 201, and a second modulator-demodulator 503b exterior to the vehicle and electrically connected to the external storage device 202. The communication apparatus 503 further comprises a first communication cable 503c detachably connected at its one end to the modulator-demodulator 503a and at its the other end to a first telephone 503e such as a mobile telephone, and a second communication cable 503f detachably connected at its one end to the modulator-demodulator 503b and at its the other end to a second telephone 503h. The first and second telephones 503e and 503h are held in communication with each other through a switching unit 503j of a telephone network 503i including a digital network or an analog network such as a public switched telephone network. In the navigation system thus constructed, the navigation unit 201 is brought into telecommunication with the external storage apparatus 202 by calling the second telephone 503h through the first telephone 503e.

FIG. 22 shows a flowchart representing the operation of the navigation system shown in FIG. 21, and having steps K1 to K7 and K9 to K15 similar to the steps T1 to T7 and T9 and T15, respectively, shown in FIG. 12(a), and a step K8 different from the step T10 shown in FIG. 12(a). In the step K8, a determination is made whether or not the first telephone 503e can be telecommunicated with the second telephone 503h. If the answer in the step K8 is in the affirmative "YES", the step K8 proceeds to the step K10.

In the fifth embodiment of the navigation system according to the present invention, the navigation apparatus 201 can be held in telecommunication with the external storage apparatus 202 through the communication apparatus 503. Therefore, the user of the navigation apparatus or the vehicle driver can utilize a new version of the navigation program or other navigation programs without renting the external storage apparatus storing therein such navigation programs, if the user of the navigation apparatus or the vehicle driver hopes to utilize such navigation programs. In addition, the communication apparatus 503 can be constructed at small cost because of the fact that not the expensive transmitter and receiver but the telephone network is used in order to electrically connect the navigation apparatus 201 to the external storage apparatus 202.

It will be understood by those skilled in the art that the foregoing description is in terms of preferred embodiments of the present invention wherein various changes and modifications may be made without departing from the spirit and scope of the invention, as set forth in the appended claims.

What is claimed is:

1. A navigation system for a vehicle, comprising:

a central processing unit mounted on said vehicle for executing a plurality of programs including a plurality of navigation programs, a transmitting program and a selection program;

an external storage device mounted on said vehicle for storing therein said navigation programs and said selection program;

an internal nonvolatile storage device mounted on said vehicle for storing therein said transmitting program;

an inner bus mounted on said vehicle for having said central processing unit electrically connected to said internal nonvolatile storage device to permit signals to be transmitted between said central processing unit and said internal nonvolatile storage device; and an interface unit having said external storage device electrically connected to said inner bus to permit said external storage device to be brought in communication with said central processing unit and said internal nonvolatile storage device, when a vehicle driver requests exchange of said navigation programs, said central processing unit being firstly operated to execute said selection program to have a vehicle driver select one from said navigation programs stored in said external storage device, being secondly operated to execute said transmitting program to read the selected navigation program from said external storage device and store the read navigation program in said internal nonvolatile storage device, and being thirdly operated to repeat the execution of the navigation program stored in said internal nonvolatile storage device to provide said vehicle driver with navigation information.

2. A navigation system as set forth in claim 1, wherein said internal nonvolatile storage device comprises an erasable programmable read-only memory.

3. A navigation system for a vehicle, comprising:

a central processing unit mounted on said vehicle for executing a plurality of programs including a plurality of navigation programs, a transmitting program and a selection program;

an external storage device mounted on said vehicle for storing therein said navigation programs and said selection program;

an internal nonvolatile storage device mounted on said vehicle for storing therein said transmitting program;

an inner bus mounted on said vehicle for having said central processing unit electrically connected to said internal nonvolatile storage device to permit signals to be transmitted between said central processing unit and said internal nonvolatile storage device;

an interface unit having said external storage device electrically connected to said inner bus to permit said external storage device to be brought in communication with said central processing unit and said internal nonvolatile storage device, said internal nonvolatile storage device including a read-only memory storing therein said transmitting program and an erasable programmable read-only memory; and when a vehicle driver requests exchange of said navigation programs, said central processing unit being firstly operated to execute said selection program to have a vehicle driver select one from said navigation programs stored in said external storage device, being secondly operated to execute said transmitting program to read the selected navigation program from said external storage device and store the read navigation program in said erasable programmable read-only memory, and being thirdly operated to repeat the execution of the navigation program stored in said erasable programmable read-only memory to provide said vehicle driver with navigation information.

4. A navigation system as set forth in claim 3, wherein said navigation program stored in said erasable programmable read-only memory has error detecting and correcting codes, said read-only memory storing therein an error check correction program to be executed by said central processing unit firstly to detect the error of said navigation program on the basis of said error detecting and correcting codes of said navigation program, secondly to determine whether the detected error is correctable, and thirdly to correct the detected error of said navigation program when the detected error of said navigation program is correctable, said central processing unit being operated to execute said error check correction program to detect and correct said navigation program stored in said erasable programmable read-only memory after said central processing unit executes said transmitting program, and when the detected error of said navigation program is uncorrectable, said central processing unit being further operated to execute said transmitting program to substitute the navigation program stored in said external storage device for the erroneous navigation program stored in said erasable programmable read-only memory.

5. A navigation system as set forth in claim 4, said navigation system further comprising an error informing means for providing said vehicle driver with the information that the error of said navigation program is uncorrectable.

6. A navigation system as set forth in claim 5, wherein said error informing means comprises a display unit for displaying on its screen the information that the error of said navigation program is uncorrectable.

7. A navigation system as set forth in claim 5, wherein said error informing means comprises a loudspeaker unit for voicing the information that the error of said navigation program is uncorrectable.

8. A navigation system as set forth in claim 3, wherein said erasable programmable read-only memory is operative to assume two different operation modes consisting of a normal mode serving as an erasable programmable read-only memory and a read-only mode serving as an read-only memory, said navigation system further comprising mode switching means for switching said erasable programmable read-only memory between said normal mode and said read-only mode.

9. A navigation system as set forth in claim 3, wherein said erasable programmable read-only memory is operative to assume two different operation modes consisting of a normal mode serving as an erasable programmable read-only memory and a read-only mode serving as an read-only memory, said read-only memory further storing therein a mode switch program to be executed by the central processing unit to switch the erasable programmable read-only memory from the normal mode to the read-only mode after the execution of said transmitting program.

10. A navigation system for a vehicle, comprising:

a central processing unit mounted on said vehicle for executing a plurality of programs including a plurality of navigation programs, a transmitting program and a selection program;

an external storage device mounted on said vehicle for storing therein said navigation programs and said selection program;

an internal nonvolatile storage device mounted on said vehicle for storing therein said transmitting program;

an inner bus mounted on said vehicle for having said central processing unit electrically connected to said internal nonvolatile storage device to permit signals to be transmitted between said central processing unit and said internal nonvolatile storage device;

an interface unit having said external storage device electrically connected to said inner bus to permit said external storage device to be brought in communication with said central processing unit and said internal nonvolatile storage device;

said internal nonvolatile storage device including a read-only memory storing therein said transmitting program and an erasable programmable read-only memory;

when a vehicle driver requests exchange of said navigation programs, said central processing unit being firstly operated to execute said selection program to have a vehicle driver select one from said navigation programs stored in said external storage device, being secondly operated to execute said transmitting program to read the selected navigation program from said external storage device and store the read navigation program in said erasable programmable read-only memory, and being thirdly operated to repeat the execution of the navigation program stored in said erasable programmable read-only memory to provide said vehicle driver with navigation information;

said navigation program stored in said erasable programmable read-only memory having error detecting codes;

said read-only memory storing therein an error check program to be executed by said central processing unit to detect the error of said navigation program stored in said erasable programmable read-only memory on the basis of said error detecting codes of said navigation program; and said central processing unit being operated to execute said transmitting program to correct said navigation program stored in said erasable programmable read-only memory when the error of said navigation program stored in said erasable programmable read-only memory is detected by executing said error check program.

11. A navigation system as set forth in claim 10, said navigation system further comprising an error informing means for providing said vehicle driver with the information that the error of said navigation program is detected.

12. A navigation system as set forth in claim 11, wherein said error informing means comprises a display unit for displaying on its screen the information that the error of said navigation program is detected.

13. A navigation system as set forth in claim 11, wherein said error informing means comprises a loudspeaker unit for voicing the information that the error of said navigation program is detected.

14. A navigation system for a vehicle, comprising:

a central processing unit mounted on said vehicle for executing a plurality of programs including a plurality of navigation programs, a transmitting program and a selection program;

an external storage apparatus exterior to said vehicle and storing therein said navigation programs and said selection program;

an internal nonvolatile storage device mounted on said vehicle and storing said transmitting program;

an inner bus mounted on said vehicle and having said central processing unit electrically connected to said external storage apparatus and said internal nonvolatile storage device to permit signals to be transmitted between said central processing unit and said external storage apparatus; and a communication apparatus partly mounted on and partly exterior to said vehicle, and having said external storage apparatus electrically connected to said inner bus to permit said external storage apparatus to be brought in communication with said central processing unit and said internal nonvolatile storage device; and when a vehicle driver requests exchange of said navigation programs, said central processing unit being firstly operated to execute said selection program to have a vehicle driver select one from said navigation programs stored in said external storage device, being secondly operated to execute said transmitting program to read the selected navigation program from said external storage apparatus through said communication apparatus and store the read navigation program in said internal storage device, and being thirdly operated to repeat the execution of the navigation program stored in said internal storage device to provide said vehicle driver with navigation information.

15. A navigation system for a vehicle, comprising:

a central processing unit mounted on said vehicle for executing a plurality of programs including a plurality of navigation programs, a transmitting program and a selection program;

an external storage apparatus exterior to said vehicle and storing therein said navigation programs and said selection program;

an internal nonvolatile storage device mounted on said vehicle and storing said transmitting program;

an inner bus mounted on said vehicle and having said central processing unit electrically connected to said external storage apparatus and said internal nonvolatile storage device to permit signals to be transmitted between said central processing unit and said external storage apparatus;

a communication apparatus partly mounted on and partly exterior to said vehicle, and having said external storage apparatus electrically connected to said inner bus to permit said external storage apparatus to be brought in communication with said central processing unit and said internal nonvolatile storage device, said internal nonvolatile storage device including a read-only memory storing therein said transmitting program and an erasable programmable read-only memory; and when a vehicle driver requests exchange of said navigation programs, said central processing unit being firstly operated to execute said selection program to have a vehicle driver select one from said navigation programs stored in said external storage device, being secondly operated to execute said transmitting program to read the selected navigation program from said external storage apparatus through said communication apparatus and store the read navigation program in said erasable programmable read-only memory, and being thirdly operated to repeat the execution of the navigation program stored in said erasable programmable read-only memory to provide said vehicle driver with navigation information.

16. A navigation system as set forth in claim 15, wherein said erasable programmable read-only memory is operative to assume two different operation modes consisting of a normal mode serving as an erasable programmable read-only memory and a read-only mode serving as an read-only memory, said navigation system further comprising mode switching means for switching said erasable programmable read-only memory between said normal mode and said read-only mode.

17. A navigation system as set forth in claim 15, wherein said erasable programmable read-only memory is operative to assume two different operation modes consisting of a norms/mode serving as an erasable programmable read-only memory and a read-only mode serving as an read-only memory, said read-only memory further storing therein a mode switch program to be executed by the central processing unit to switch the erasable programmable read-only memory from the normal mode to the read-only mode after the execution of said transmitting program.

18. A navigation system as set forth in claim 15, wherein said communication apparatus comprises a first transmitter mounted on said vehicle and electrically connected to said inner bus, a second transmitter exterior to said vehicle and electrically connected to said external storage apparatus, and a communication cable detachably and electrically connected at its one end to said first transmitter and at its the other end to said second transmitter.

19. A navigation system as set forth in claim 15, wherein said communication apparatus comprises a first transmitter-receiver mounted on said vehicle as to be electrically connected to said central processing unit and said erasable programmable read-only memory, and a second transmitter-receiver exterior to said vehicle and electrically connected to said external storage apparatus, said central processing unit and said erasable programmable read-only memory being held in two-way radio communication with said external storage apparatus through said first and second transmitter-receivers.

20. A navigation system as set forth in claim 15, wherein said communication apparatus comprises a receiver mounted on said vehicle as to be electrically connected to said central processing unit and said erasable programmable read-only memory, and a transmitter exterior to said vehicle and electrically connected to said external storage apparatus, said central processing unit and said erasable programmable read-only memory being held in one-way radio communication with said external storage apparatus through said transmitter and said receiver.

21. A navigation system as set forth in claim 15, wherein said communication apparatus comprises a first modulator-demodulator mounted on said vehicle as to be operatively connected to said central processing unit and a second modulator-demodulator exterior to said vehicle and operatively connected to said external storage apparatus, said first and second modulator-demodulators being electrically connected to a telephone network to permit said central processing unit and said erasable programmable read-only memory to be brought in telecommunication with said external storage apparatus through said telephone network.

22. A navigation system for a vehicle, comprising:

a central processing unit mounted on said vehicle for executing a plurality of programs including a plurality of navigation programs, a transmitting program and a selection program;

an external storage device mounted on said vehicle for storing therein said navigation programs and said selection program;

an internal nonvolatile storage device mounted on said vehicle and storing said transmitting program;

an inner bus mounted on said vehicle and having said central processing unit electrically connected to said external storage apparatus and said internal nonvolatile storage device to permit signals to be transmitted between said central processing unit and said external storage apparatus;

a communications apparatus partly mounted on and partly exterior to said vehicle, and having said external storage apparatus electrically connected to said inner bus to permit said external storage apparatus to be brought in communication with said central processing unit and said nonvolatile storage device;

said internal nonvolatile storage device including a read-only memory storing therein said transmitting program and an erasable programmable read-only memory;

when a vehicle driver requests exchange of said navigation programs, said central processing unit being firstly operated to execute said selection program to have a vehicle driver select one from said navigation programs stored in said external storage device, being secondly operated to execute said transmitting program to read the selected navigation program from said external storage device and store the read navigation program in said erasable programmable read-only memory, and being thirdly operated to repeat the execution of the navigation program stored in said erasable programmable read-only memory to provide said vehicle driver with navigation information;

said navigation program stored in said erasable programmable read-only memory having error detecting codes;

said read-only memory storing therein an error check program to be executed by said central processing unit to detect the error of said navigation program stored in said erasable programmable read-only memory on the basis of said error detecting codes of said navigation program; and said central processing unit being operated to execute said transmitting program to correct said navigation program stored in said erasable programmable read-only memory when the error of said navigation program stored in said erasable programmable read-only memory is detected by executing said error check program.

23. A navigation system as set forth in claim 22, said navigation system further comprising an error informing means for providing said vehicle driver with the information that the error of said navigation program is detected.

24. A navigation system as set forth in claim 22, wherein said navigation program stored in said erasable programmable read-only memory has error detecting and correcting codes, said read-only memory storing therein an error check correction program to be executed by said central processing unit firstly to detect the error of said navigation program on the basis of said error detecting and correcting codes of said navigation program, secondly to determine whether the detected error is correctable, and thirdly to correct the detected error of said navigation program when the detected error of said navigation program is correctable, when the detected error of said navigation program is uncorrectable, said central processing unit being further operated to execute said transmitting program to substitute the navigation program stored in said external storage apparatus for the erroneous navigation program stored in said erasable programmable read-only memory.

25. A navigation system as set forth in claim 24, said navigation system further comprising an error informing means for providing said vehicle driver with the information that the error of said navigation program is uncorrectable.

* * * * *